United States Patent
Kuby et al.

(10) Patent No.: US 11,433,312 B2
(45) Date of Patent: Sep. 6, 2022

(54) SYSTEMS, METHODS, AND APPARATUSES FOR IMPLEMENTING AN ONLINE MAP-BASED SPORTS FANTASY GAME COMPETITION

(71) Applicant: Geo Fantasy Sports, LLC, Tempe, AZ (US)

(72) Inventors: Michael Kuby, Tempe, AZ (US); Daniel Krahenbuhl, Tempe, AZ (US); Scott Kelley, Reno, NV (US); Kevin Kane, Long Beach, CA (US); Don Eugene-Nolan Gibson, Scottsdale, AZ (US)

(73) Assignee: Geo Fantasy Sports, LLC, Tempe, AZ (US)

( * ) Notice: Subject to any disclaimer, the term of this patent is extended or adjusted under 35 U.S.C. 154(b) by 1 day.

(21) Appl. No.: 17/013,586

(22) Filed: Sep. 5, 2020

(65) Prior Publication Data

US 2021/0069599 A1 Mar. 11, 2021

Related U.S. Application Data

(60) Provisional application No. 62/896,369, filed on Sep. 5, 2019.

(51) Int. Cl.
*A63F 13/828* (2014.01)
*A63F 13/795* (2014.01)
*A63F 13/537* (2014.01)

(52) U.S. Cl.
CPC .......... *A63F 13/828* (2014.09); *A63F 13/537* (2014.09); *A63F 13/795* (2014.09)

(58) Field of Classification Search
CPC ................. A63F 13/828; A63F 2300/8052
See application file for complete search history.

(56) References Cited

U.S. PATENT DOCUMENTS

| | | | | |
|---|---|---|---|---|
| 7,618,312 | B1 * | 11/2009 | Kasten | ............. A63F 13/12 463/7 |
| 2002/0107073 | A1 * | 8/2002 | Binney | ............. A63F 13/828 463/42 |

(Continued)

*Primary Examiner* — Steven J Hylinski
(74) *Attorney, Agent, or Firm* — Elliott, Ostrander & Preston, P.C.

(57) ABSTRACT

Disclosed herein are systems, methods, and apparatuses for implementing an online map-based sports fantasy game competition. For example, in a accordance with a particular embodiment, there is a system having at least a processor and a memory therein and having further means for receiving a request at the system from a remotely located user device requesting access to a user game interface; transmitting the user game interface to the user device for display; receiving first user input from the user game interface displayed to the user device, wherein the first user input specifies one or more of: (i) game settings, (ii) rules of gameplay, and (iii) scoring settings; receiving second user input from the user game interface displayed to the user device, wherein the second user input specifies multiple players to participate as a player league in a game instance; creating the player league and instantiating the game instance and the player league for the game instance at the system based on the first and second user inputs; setting a date and time for a league draft for the game instance; executing the league draft at the system by following a draft order for the multiple players of the player league, with each of the multiple players of the player league individually taking turns selecting an unclaimed polygon from a geographic map board during a first round of gameplay to establish a home territory for each of the multiple players of the player league; accumulating points based on the rules of gameplay and scoring settings specified; and determining one of the multiple players within the player league as a winner based on which player has accumulated a highest (Continued)

point total after all rounds of gameplay and terminating the game instance. Other related embodiments are disclosed.

20 Claims, 24 Drawing Sheets

(56) References Cited

U.S. PATENT DOCUMENTS

| | | | |
|---|---|---|---|
| 2003/0203757 A1* | 10/2003 | Chanda | A63F 13/828 |
| | | | 463/42 |
| 2004/0266535 A1* | 12/2004 | Reeves | A63F 13/69 |
| | | | 463/42 |
| 2005/0164792 A1* | 7/2005 | Wilcock | A63F 13/12 |
| | | | 463/42 |
| 2005/0239549 A1* | 10/2005 | Salvatore | A63F 13/61 |
| | | | 463/42 |
| 2007/0243917 A1* | 10/2007 | Wojewoda | A61F 13/12 |
| | | | 463/9 |
| 2007/0243918 A1* | 10/2007 | Wojewoda | A61F 13/12 |
| | | | 463/9 |
| 2018/0036641 A1* | 2/2018 | Parisi | A63F 13/655 |

* cited by examiner

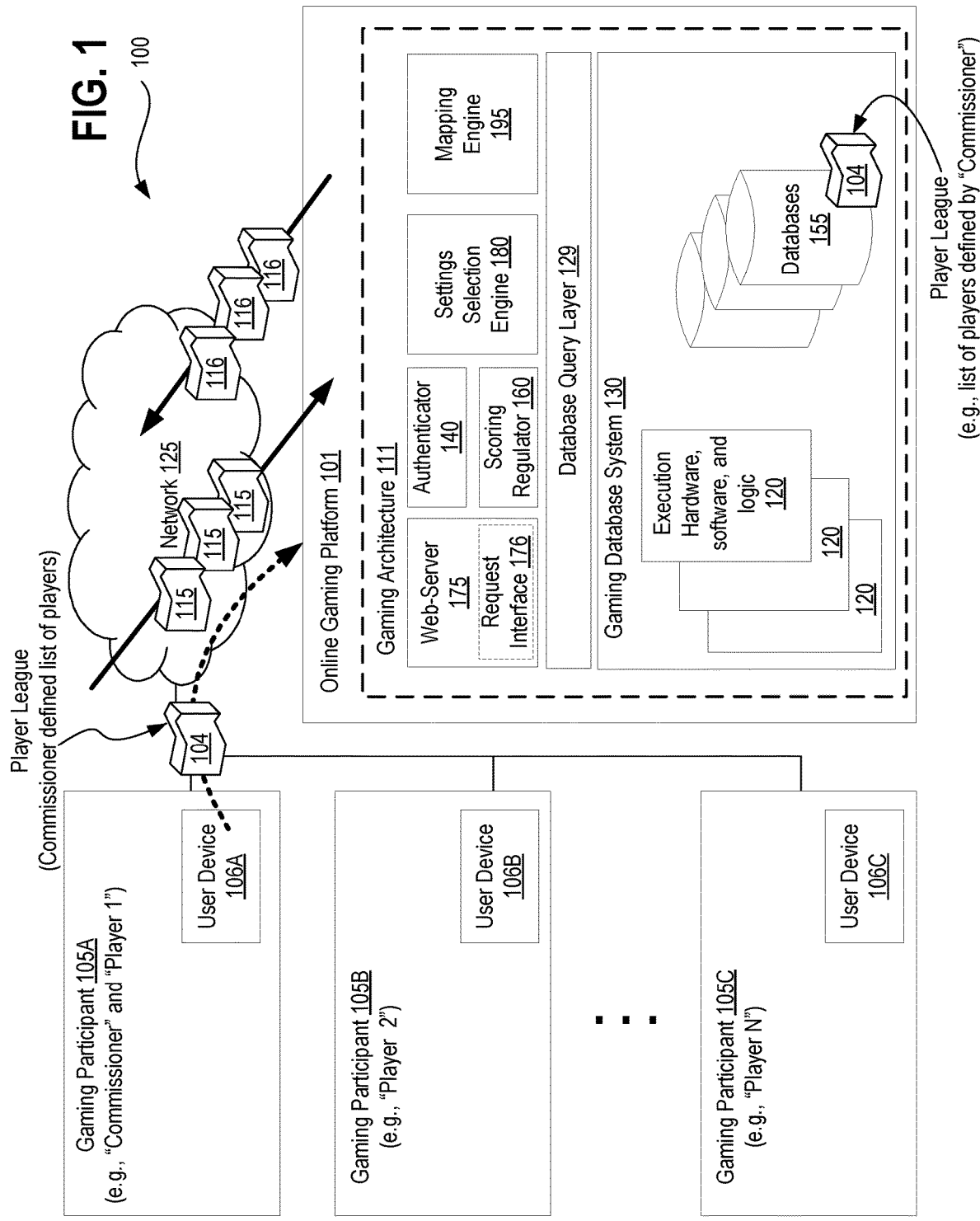

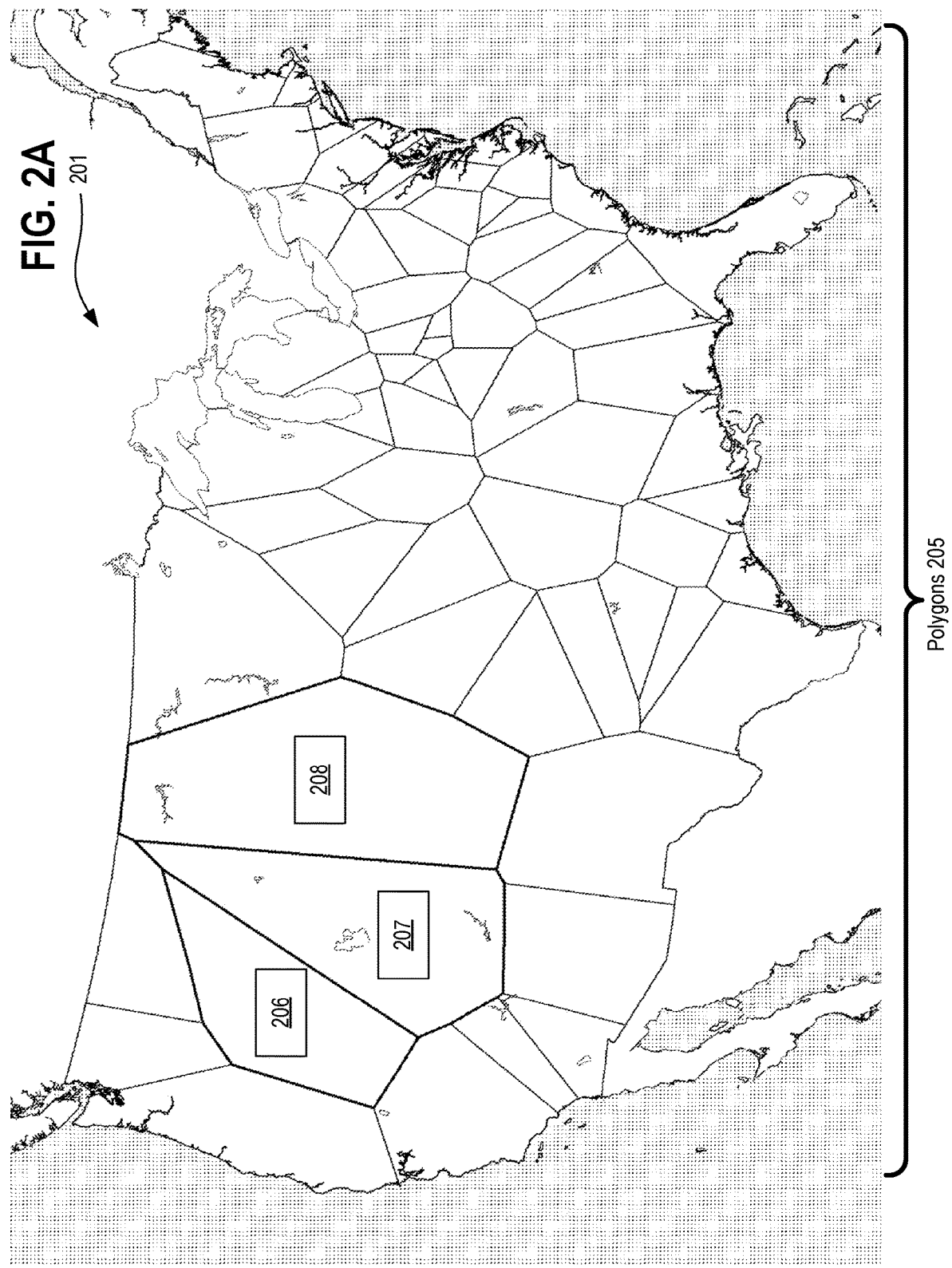

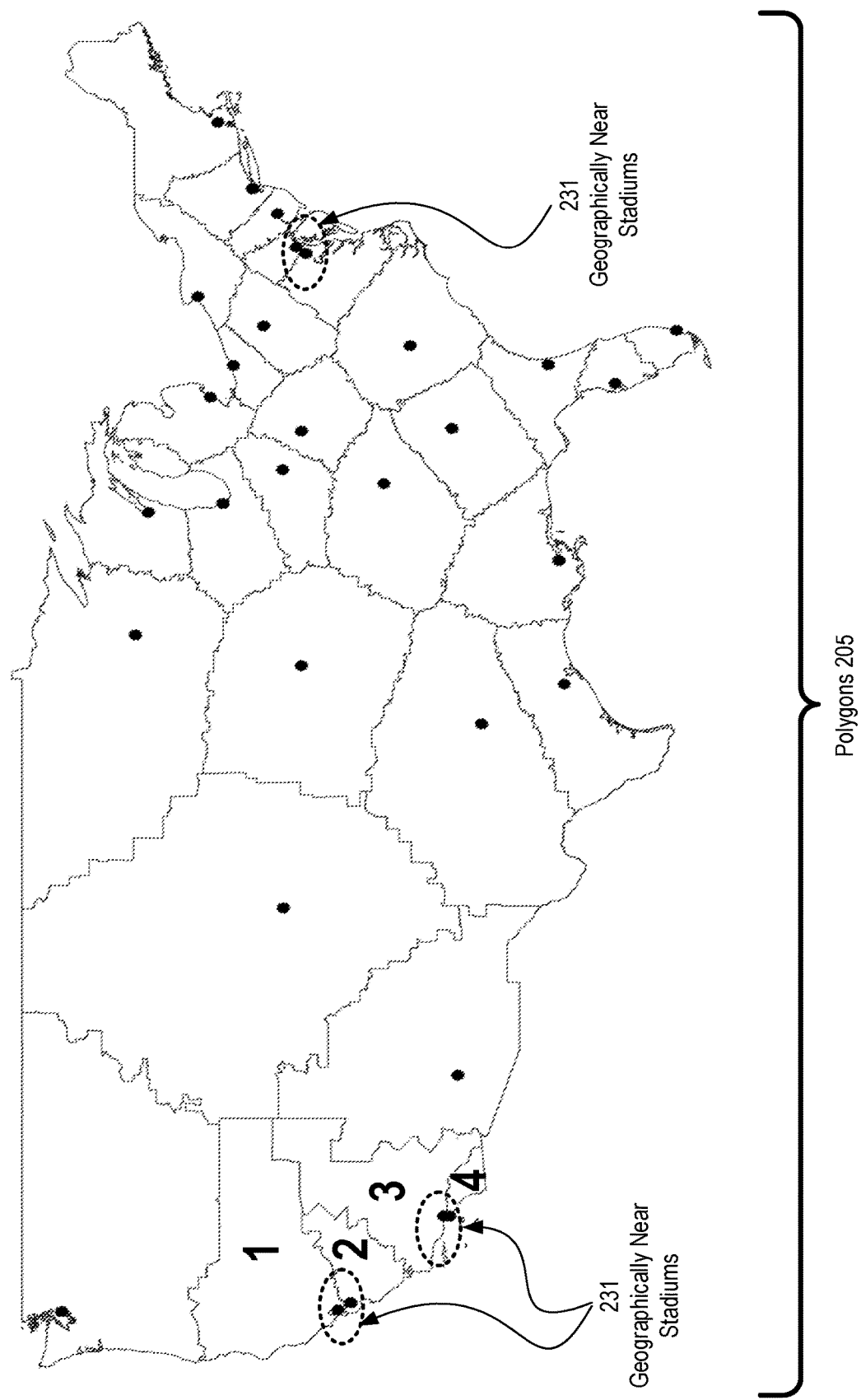

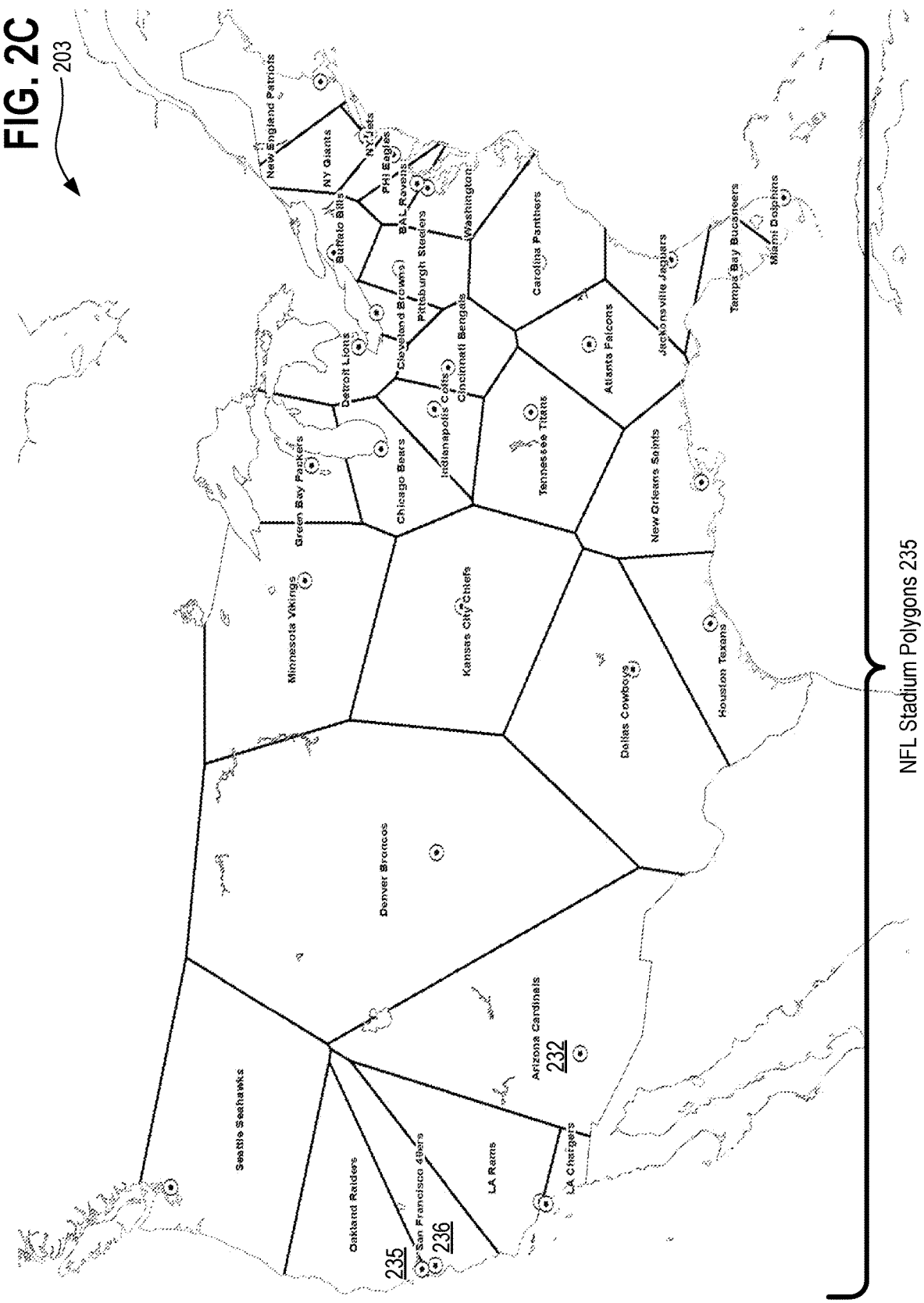

| Player's Team Name 211 | My Old Kentucky Home | Duke of March | Dunkapolis | Tornado Alley | Threez Wiz | How the West Won | The Leftovers |
|---|---|---|---|---|---|---|---|
| Team# 212 | Team1 221 | Team2 222 | Team3 223 | Team4 224 | Team5 225 | Team6 226 | Team7 227 |
| | College / Seed | College / Seed | College / Seed | College / Seed | College / Seed | College / Seed | College / Seed |
| Round 1 - Initial Seed Region 213 | Kentucky / 1 | Duke / 1 | Villanova / 1 | Oklahoma / 3 | Wisconsin / 3 | Utah / 4 | Kansas / 2 |
| Round 2 | Louisville / 4 | UNC / 3 | Maryland / 3 | SMU / 5 | Notre Dame / 5 | Arizona / 3 | Arkansas / 4 |
| Round 3 | Purdue / 6 | Virginia / 2 | Georgetown / 2 | Oklahoma St / 10 | Dayton / 6 | Gonzaga / 7 | Iowa / 5 |
| Round 4 | Georgia / 7 | West Virginia / 10 | VCU / 10 | Wyoming / 5 | Xavier / 8 | New Mexico St / 5 | Northern Iowa / 4 |
| Round 5 | North Florida / 9 | Ohio State / 7 | NC State / 7 | Wichita St / 12 | Valparaiso / 11 | Texas / 8 | Stephen F Austin / 13 |
| Round 6 | Belmont / 13 | Michigan St / 11 | Buffalo / 11 | ND State / 8 | Butler / 14 | Baylor / 6 | Louisiana-Lafayette / 9 |
| Round 7 | Georgia State / 13 | Coastal Carolina / 14 | Albany / 9 | Iowa State / 9 | Cincinnati / 10 | Eastern Washington / 6 | Texas Southern / 14 |
| Round 8 | Davidson / 16 | Robert Morris / 14 | Harvard / 14 | BOXED IN / 8 | Indiana / 15 | Oregon / 9 | LSU / 15 |
| Round 9 | UAB / 17 | Wofford / 16 | Providence / 16 | Boise St / 15 | BOXED IN / 12 | San Diego St / 12 | Ole Miss / 16 |
| Round 10 | | | | BOXED IN / Hampton / 15 | UCLA / 15 230 | | |
| | | | | 229 | 228 | | |
| Average Seed (231) | 9.56 | 8.67 | 7.89 | 9.33 | 7.33 | 7.22 | 9.11 |
| Number of Teams (232) | 9 | 9 | 9 | 9 | 9 | 9 | 9 |
| 1-4 Seeds (233) | 2 | 3 | 2 | 1 | 2 | 3 | 3 |
| 1-8 Seeds (234) | 4 | 4 | 3 | 4 | 7 | 5 | 4 |

Bold = Highest Seed of Round (235)

FIG. 2F

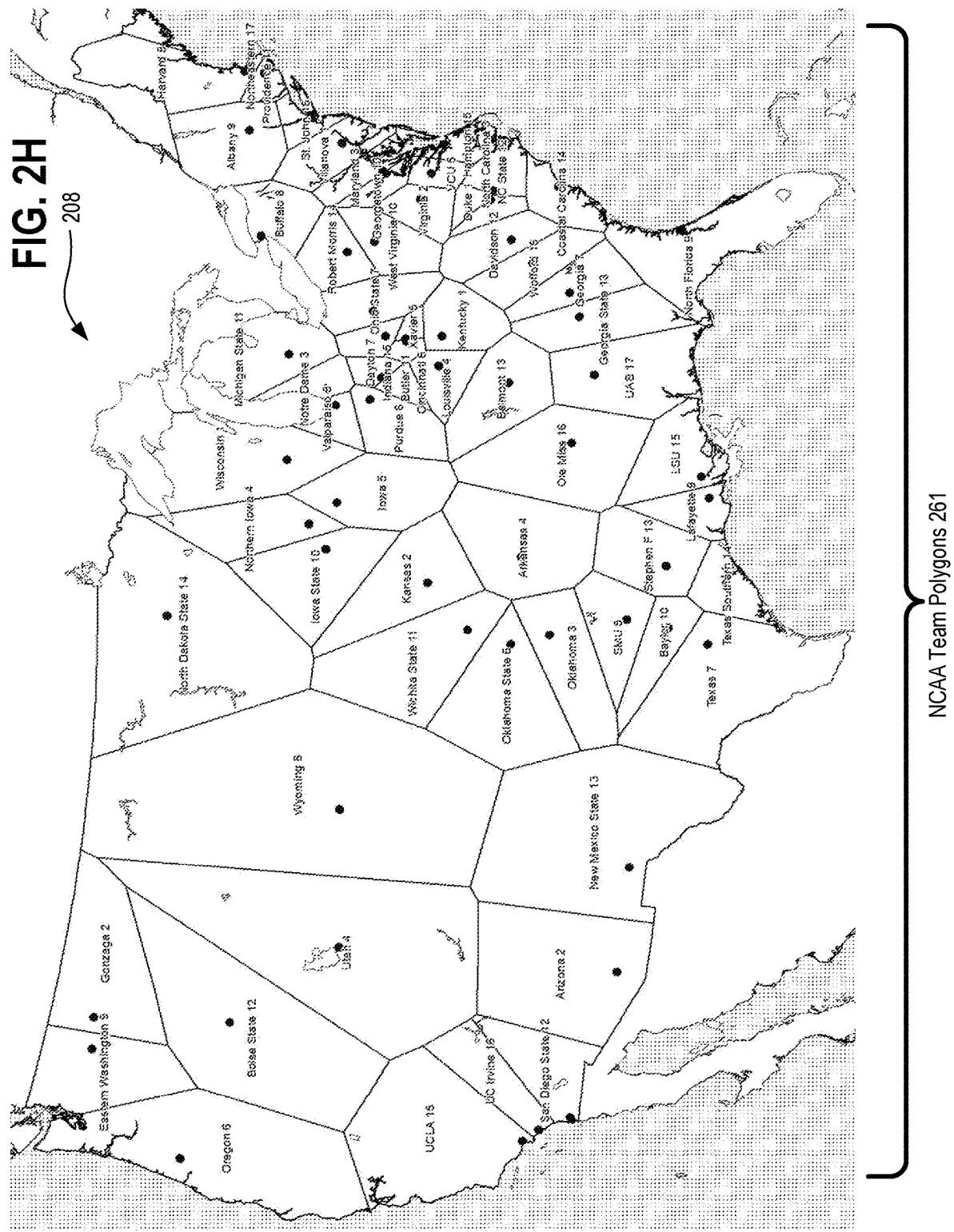

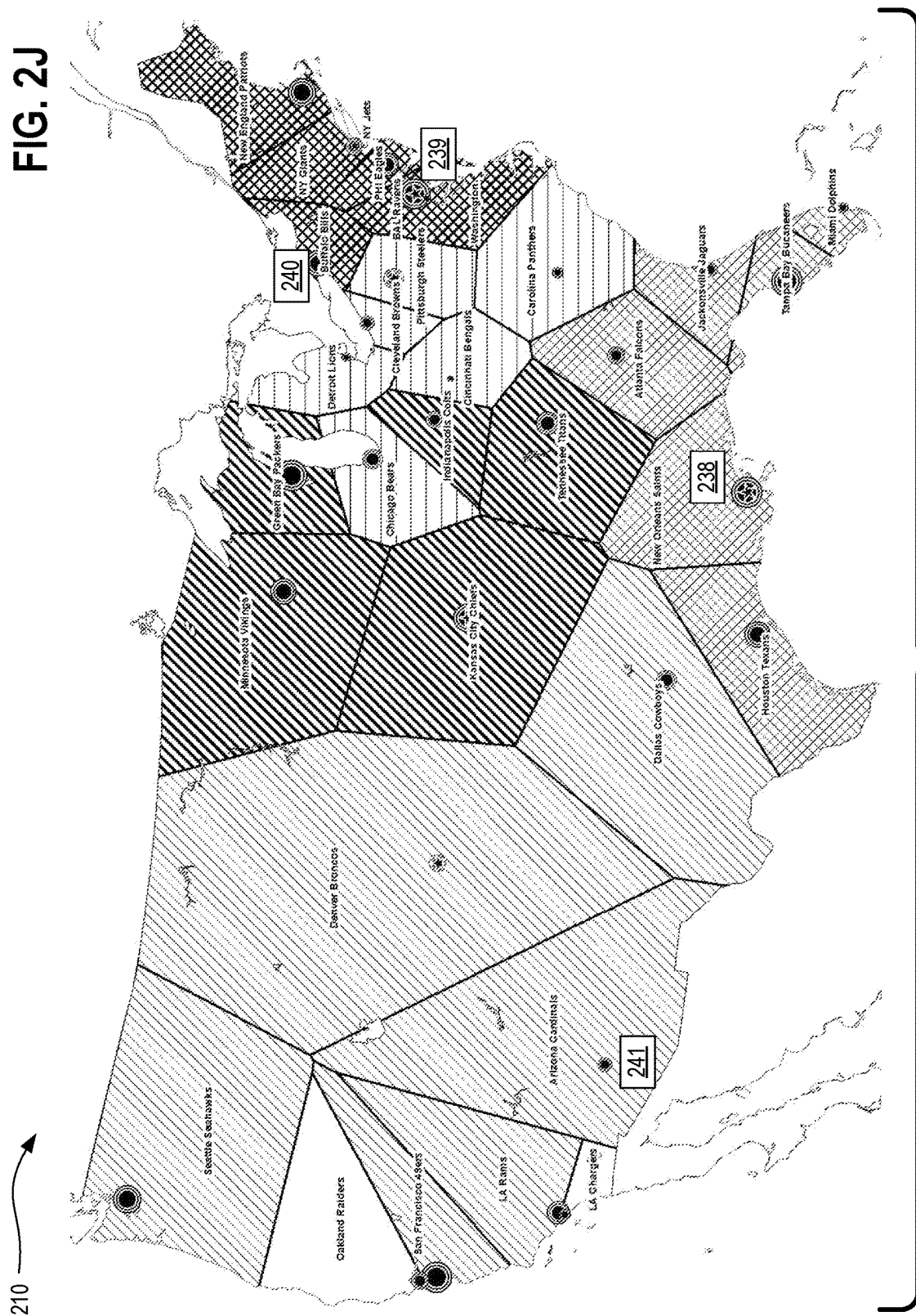

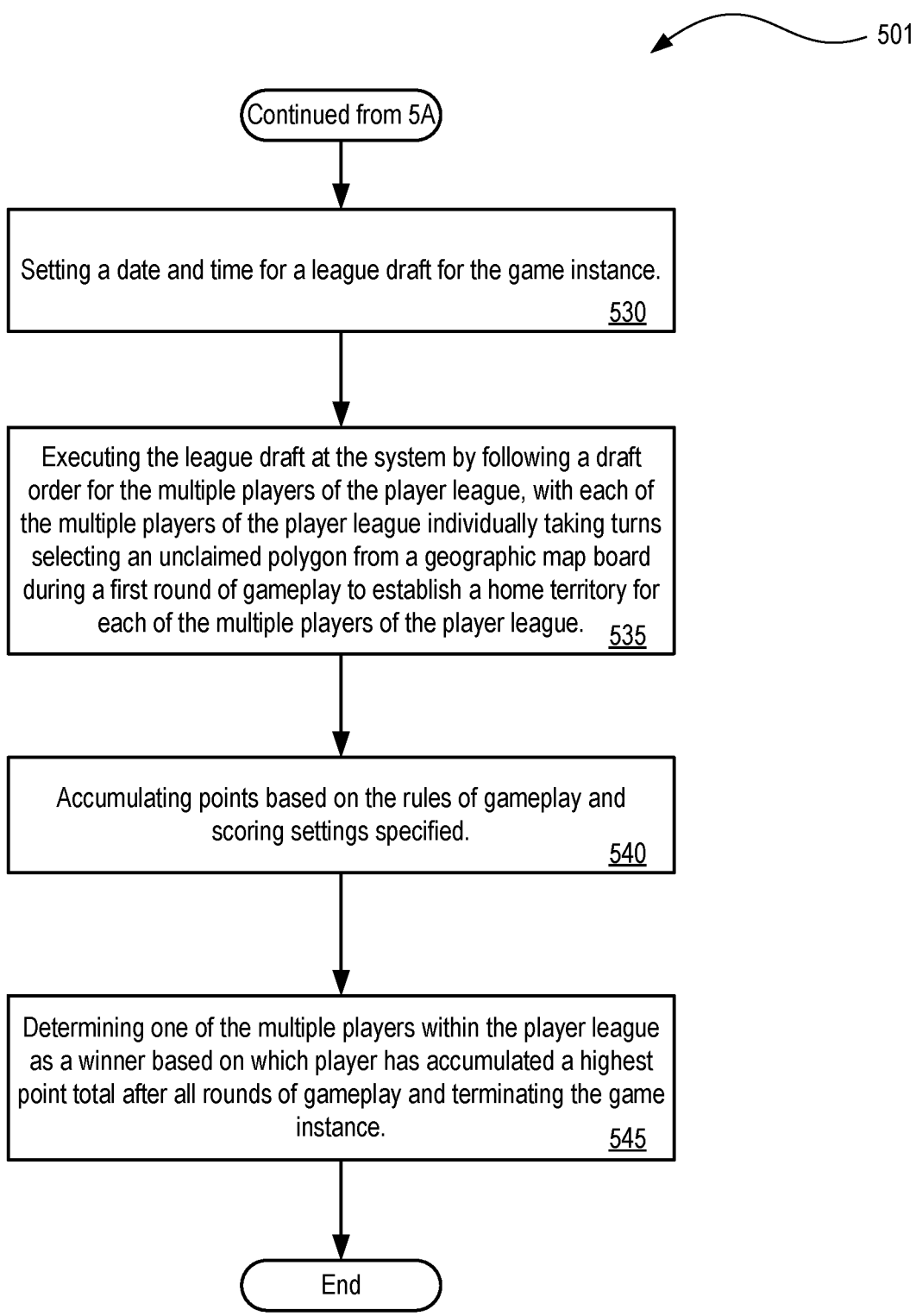

ered in connection with the figures in which:
SYSTEMS, METHODS, AND APPARATUSES FOR IMPLEMENTING AN ONLINE MAP-BASED SPORTS FANTASY GAME COMPETITION

CLAIM OF PRIORITY

This U.S. Utility patent application is related to, and claims priority to, the U.S. Provisional Application No. 62/896,369 filed Sep. 5, 2019, entitled "SYSTEMS, METHODS, AND APPARATUSES FOR IMPLEMENTING AN ONLINE MAP-BASED SPORTS FANTASY GAME COMPETITION," and the entire contents of which are incorporated herein by reference.

GOVERNMENT RIGHTS AND GOVERNMENT AGENCY SUPPORT NOTICE

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of online system implemented gaming, and more particularly, to systems, methods, and apparatuses for implementing an online map-based sports fantasy game competition.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed embodiments.

Filling out the brackets for the men's and women's NCAA basketball championship tournaments each year has become a national tradition in America. Friends, families, and even office colleagues frequently compete in pools to determine who might best predict the outcomes of games and ultimately the tournament champions. The tournament is colloquially referred to as "March Madness," and enthusiasts refer to the challenge of picking and predicting the winners as the "Tournament Challenge."

Paralleling this phenomenon has been the explosion of fantasy sports, known as fantasy football or "Rotisserie League Baseball," etc. In contrast with filling out brackets for a tournament, in most fantasy sports, each "owner" of a fantasy team chooses an exclusive team of players and accumulates points based on their players' statistics. In many fantasy leagues, any player belongs to only one owner, whereas in bracket pools, all contestants pick all the games and thus, it is possible for multiple of the contestants to coincidentally choose the same ultimate winner.

Fantasy sports has become a multi-billion dollar industry, with an estimated 60 million participants in the US and Canada and millions more internationally, all of whom draft players from professional soccer, cricket, golf, etc. The daily fantasy sports betting industry is similarly a large and presently growing industry, in which players choose sets of players on a daily basis.

Alongside these sports-based gaming phenomena is the growing popularity of both online and offline board games, particularly territorial games where players start in one or a few places and expand outwards. Games such as "Settlers of Catan" and "Risk" are two popular examples from different eras.

Embodiments disclosed herein apply specialized computing technologies in conjunction with customized computing and networking hardware to combine elements of these extremely popular interactive sports and entertainment activities into a unique and fun online group activity, which may be extended from college basketball, NFL football, MLS Soccer, World Cup European Football, and to a wide variety of other applications.

Problematically, existing fantasy sports online platforms, including sports websites and websites for picking teams and tournament results are non-geographical and lack information about where the teams in the tournament or league are located relative to other teams. Simply stated, existing fantasy sports online platforms do not currently constrain draft choices by geographic location or geographic relationship to previous choices. Still further, such conventional online platforms lack visual representations of the status of teams geographically, such as the locations of teams, the geographic concentration of teams, which teams neighbor which other teams, which areas are nearest to which teams at the start of the contest or gameplay and as teams are eliminated, or which geographic location eliminates another geographic location in the contest or gameplay.

The present state of the art may therefore benefit from the systems, methods, and apparatuses for implementing an online map-based sports fantasy game competition as are described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 depicts an exemplary architecture in accordance with described embodiments;

FIG. 2A depicts an exemplary starting map game board based on the teams that qualified for a particular year's NCAA Men's Basketball Tournament, in accordance with described embodiments;

FIG. 2B depicts another exemplary starting map game board based on the geographic coordinates of stadium locations of the teams competing in a league or tournament, in this example all NFL teams, in accordance with described embodiments;

FIG. 2C depicts another exemplary starting map game board based on NFL stadium locations to produce NFL Stadium Polygons, in accordance with described embodiments;

FIG. 2F depicts a GUI table of the game board used for tracking player or team selections or "drafts," in accordance with described embodiments;

FIG. 2H depicts another exemplary starting game board based on the NCAA Men's Basketball Tournament, in accordance with described embodiments;

FIG. 2J depicts an exemplary ending map game board based on NFL team win results, in accordance with described embodiments;

FIGS. 5A and 5B depict flow diagrams illustrating a method for implementing an online map-based sports fantasy game competition, in accordance with disclosed embodiments.

DETAILED DESCRIPTION

Figure 2D:
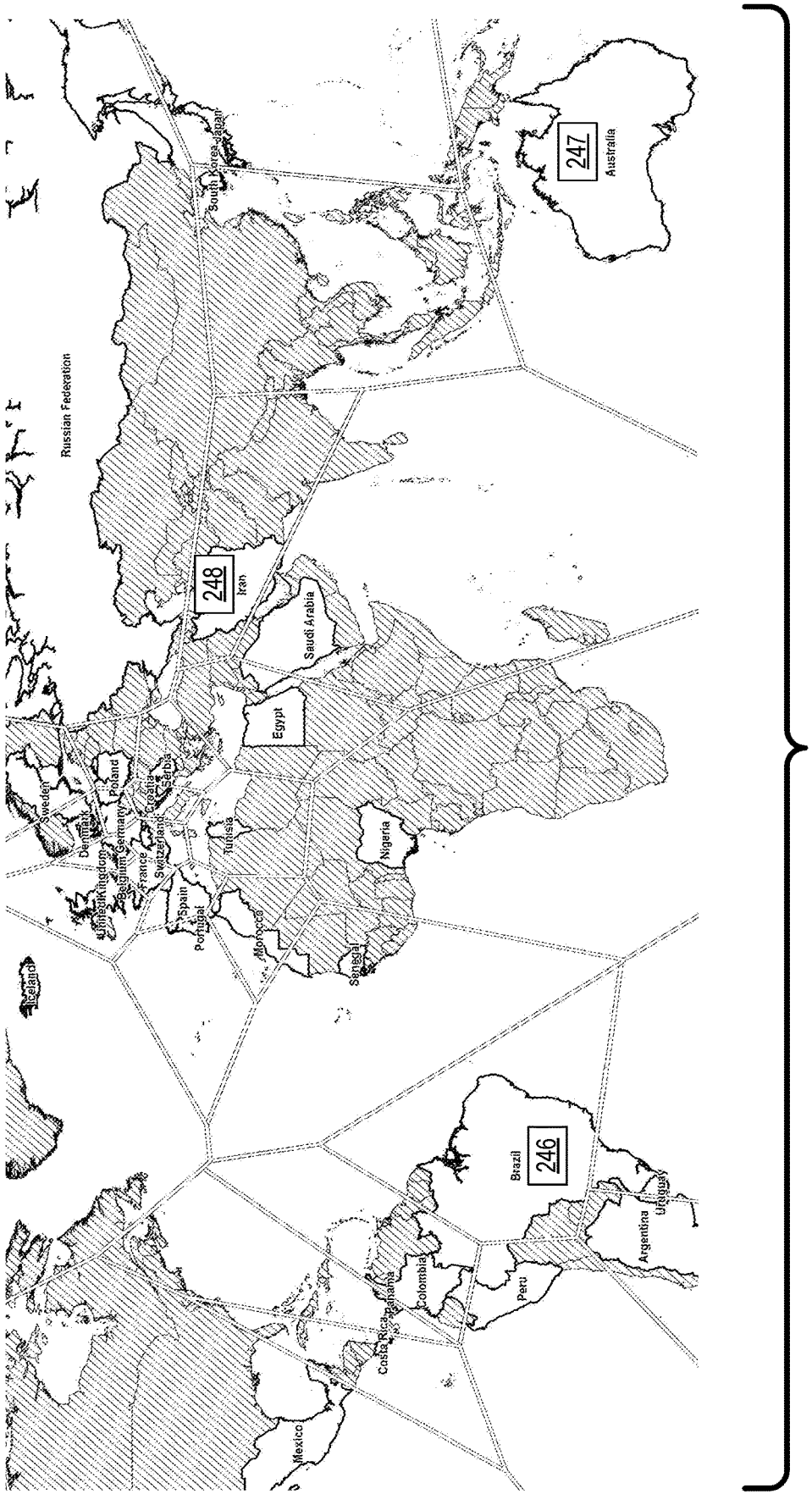
FIG. 2D depicts another exemplary World Cup map and starting game board based on qualifying World Cup countries, in accordance with described embodiments.

Described herein are systems, methods, and apparatuses for implementing an online map-based sports fantasy game competition. For example, there are described in accordance with certain embodiments a system having at least a processor and a memory therein and having further means for receiving a request at the system from a remotely located user device requesting access to a user game interface. Such a system further includes means for transmitting the user game interface to the user device for display; receiving first user input from the user game interface displayed to the user device, wherein the first user input specifies one or more of: (i) game settings, (ii) rules of gameplay, and (iii) scoring settings; receiving second user input from the user game interface displayed to the user device, wherein the second user input specifies multiple players to participate as a player league in a game instance; creating the player league and instantiating the game instance and the player league for the game instance at the system based on the first and second user inputs; setting a date and time for a league draft for the game instance; executing the league draft at the system by following a draft order for the multiple players of the player league, with each of the multiple players of the player league individually taking turns selecting an unclaimed polygon from a geographic map board during a first round of gameplay to establish a home territory for each of the multiple players of the player league; accumulating points based on the rules of gameplay and scoring settings specified; and determining one of the multiple players within the player league as a winner based on which player has accumulated a highest point total after all rounds of gameplay and terminating the game instance.

Because existing fantasy sports online platforms lack any geographic information and lack the ability to provide visual representations of the status of teams or other ranking or statistical data utilized for each game instance geographically, such as the locations of teams, companies, profits, weather or current events, etc., there is a need to provide an improved online gaming platform and specialized computing and gaming architecture having an integrated mapping engine via which to retrieve, consume, and incorporate the external data with visualized game mechanics and execution logic. Notably, described embodiments introduce a critical strategy component to the game instance, thus challenging players in a manner that does not exist within conventionally known fantasy sports platforms. For instance, not only is a geographic or map component added to the gameplay, but there is further introduced the requirement for players to implement board game like strategies into their fantasy sports selections of either team or athlete drafts. This is because, unlike conventional fantasy sports platforms, players utilizing the disclosed online gaming platform must consider not only the predictive or expected performance of a given team or athlete, but must also take into consideration various geographic restrictions, such as how their polygon selections on a game map board open or foreclose opportunities for future polygon selections as well as how their polygon selections similarly provide or foreclose the ability for an opponent player to select potentially advantageous polygons via the game board map.

Other use cases become available as well through the application of such specialized computing and gaming architecture. Consider for example, various athletic sports use cases, such as the online gaming platform facilitating the ability for players to pick contiguous regions of teams in a tournament, like the NCAA basketball tournament or World Cup, with points awarded for advancing deeper in the tournament, or the ability for players to pick contiguous regions of teams for a sports season, with points awarded for wins and/or playoff advancement, or the ability for players to pick contiguous regions of teams for a day or week of a season, with points awarded for wins, or the ability for players to pick contiguous regions of teams for the Olympics, with points awarded for medals won, or the ability for players to pick fantasy teams of individual players (athletes) from a contiguous region of sports teams, with points awarded based on their statistical performance over the course of a season, or the ability for players to pick fantasy teams of individual players (athletes) from a contiguous region of sports teams, with points awarded based on their statistical performance for a single game. Additional non-athletic use cases exist as well, such as those in which a specialized educational gaming platform is implemented. For example, such a platform may operate on behalf of student-players to predict where news headlines or weather events occur most frequently, geographically speaking, all on the basis of player participants interacting with one or many game instances. Another example is that in which the specialized gaming platform ranks financial stocks based on configurable statistics and parameters presented to player participants interacting with one or many game instances. Still further, another example, is that in which the specialized gaming platform receives a data stream of crowd-sourced participant input regarding concurrent events to represent whether or not a "hive mind" or crowd-sourced data set collectively indicates a sentiment of a given team winning or losing an ongoing competition, based on those player participants interacting with one or many game instances via the gaming platform. Such analysis of crowd-sourced data via the specialized gaming platform may prove useful to bookmakers or other individuals setting betting and gaming parameters or "odds."

Disclosed embodiments therefore describe means by which to improve game-play mechanics by providing a geographic map of connected regions (referred to as "polygons" herein) as a basis from which players may construct territories. These improvements in turn provide educational learning by teaching players geography, for example, by identifying the geographic locations of countries and territories participating as teams in the Olympic Games or the locations of the cities of participating colleges in the NCAA tournament leagues. Practice of the disclosed embodiments further enable application in other types of sports, regions, and geographic scales, as well other sports competitions such as non-athletic competitions including electronic gaming (e.g., "e-sports") and trivia sports, quiz bowls, and geographic based academic competitions.

Still further, certain disclosed embodiments relate to non-competition events, such as the display and game mechanics based upon rankings wholly external to any formal competition. For instance, statistics may be generated by which to rank regions on non-competition criteria. For instance, an exemplary game instance may be generated and executed on the basis of which player or participant assembles a geographic draft within a particular geographic region in which corporations perform better in the stock market over a period of time, such as a semester or calendar year, fiscal quarter, etc. Such a map may, for example, consist of polygons around the 100 largest cities or the polygons may correspond to the 50 States of the United States of America or correspond to provinces, states, or governmental regions of other countries. In such a way, there is no formal "competition," be it athletic or otherwise, and yet, the game engine may nevertheless be utilized to generate and execute a game instance based on such ranking criteria and thus turned into a geographic competition, with the winning player, by way of example, being the one whose region had the highest average rate of return on the stocks headquartered in their region.

Consider another example in which individual players or a class of students in a college business course competing on predicting the performance of currencies, stock markets or economic growth. Similarly, a social studies or geography class may compete on predicting news coverage, natural disasters, election results, or knowledge of facts about states or countries. In such a way, the systems, methodologies, and apparatuses described herein provide solutions to the need for interactive geographic representations of regions and teams that are subject to dynamic changes during game-play.

Many other such examples exist and will be illustrated in further detail through the teachings of the disclosed embodiments.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various customizable and special purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

FIG. 1 depicts an exemplary architecture 100 in accordance with described embodiments.

In one embodiment, a gaming architecture 111 is communicably interfaced with a plurality of user devices 106A-C (e.g., such as mobile devices, smart phones, tablets, PCs, etc.) through online gaming platform 101. The online gaming platform 101 is communicably interfaced with the user devices 106A-C via Network 125, for instance, over the public Internet. Gaming participants 105A-C associated with each of the user devices 106A-C make take on different roles for any given game instance. For example, gaming participant 105A is referred to here as the "commissioner," but may take on a different role in other game instances managed by the online gaming platform 101. Notably, in most cases, the "commissioner" will also be a "player" or a "player participant" for the game instance configured, instantiated, and defined by the gaming participant having the role of "commissioner." Here, the commissioner is additionally defined as "Player 1," whereas gaming participant 105B is defined as "Player 2," up through and including gaming participant 105C which is defined here as "Player N." In accordance with the described embodiments, there must be at least two player participants, one of which may or may not be the commissioner, but there may be several, dozens, hundreds, or even thousands of participants, depending on the particular gaming instance type, format, and configuration instantiated by the commissioner.

In one embodiment, a gaming database system 130 includes databases 155, for example, to store tables, datasets, and underlying database records with user data, game settings, maps, commissioner selections, graphs, statistics tables, etc., on behalf of gaming participants 105A-C (e.g., players, player leagues as defined by the commissioners for the variously instantiated gamine instances, commissioners, etc., utilizing the online gaming platform 101). The computing architecture elements of gaming architecture 111, including web-server 175, authenticator 140, scoring regulator 160, settings election engine 180, mapping engine 195, each are communicably interfaced with and query into the gaming database system through the database query layer 129. As depicted here, note that gaming participant 105A acting as the commissioner for a particular gaming instance has transmitted a "player league" 104 to the online gaming platform via the cloud or network 125, with the player league ultimately being stored by the databases 155 of the gaming database system 130 in fulfillment of executing the gaming instance on behalf of the players and gaming participants 105B. As shown here, a player league 104 defines a list of players and specifically includes a list of players as defined by the commissioner. In alternative embodiments, a commissioner may optionally designate a "random" list or an open invitation period in which the online gaming platform randomly associates gaming participants with the player league defined by the commissioner by pulling awaiting players from a queue or by allowing players to join the player league defined by the commissioner during an open enrollment period up to a maximum number of players designated by the commissioner. Commonly, however, the commissioner will specify a list of players, such as friends and family or colleagues personally known to the commissioner, for instance, by initiating invites to those individuals via email, text, or social media links or their online gaming handles (e.g., nicknames) within the online gaming platform 101.

Gaming database system 130 includes a plurality of underlying hardware, software, and logic elements 120 that implement database functionality and a code execution environment within the online gaming platform 101. In accordance with one embodiment, gaming database system 130 further implements databases 155 to service database queries and other data interactions with the databases 155 in support of the online map-based sports fantasy game competition as described herein. The hardware, software, and logic elements 120 of the gaming database system 130 are separate and distinct from a plurality of user devices 106A, 106B, and 106C which are utilized by the gaming participants (105A, 105B, and 105C) interacting with the services provided by the online gaming platform 101. In such a way, online gaming platform 101 may implement on-demand gaming services, on-demand database services in support of the online map-based sports fantasy game competition, or cloud computing services implementing the online map-based sports fantasy game competition on behalf of subscribing gaming participants 105A-C.

As shown here, the online gaming platform 101 receives input and other requests 115 from a plurality of gaming participants 105A-C via network 125 (such as the public Internet). For example, incoming gaming interactions and events (such as commissioner invitations and invitation acceptance events by players and player leagues, etc.), API requests for support GUI interfaces executing at the user devices 106A-C, interactions with displayed graphical user interfaces and displays at the user devices 106A-C, or other inputs may be received from the gaming participants 105A-C to be processed against the gaming database system 130 via the gaming architecture and its various sub-systems. In certain embodiments, the inputs and requests 115 from the gaming participants 105A-C may include rules selections, acceptance of default settings or request for non-default options, scoring systems and scoring settings, game settings and parameters, all of which is to be hosted, stored, and executed within the online gaming platform 101 on behalf of such gaming participants 105A-C. In such embodiments, responses 116 from the online gaming platform 101 may constitute data records, reports, analytics, charts, GUI displays to be presented at the user devices, confirmation of rules, scoring, and game settings by the online gaming platform 101, or other information in support of the online map-based sports fantasy game competition as described herein, or may be some combination thereof.

In one embodiment, each gaming participant 105A-C is an entity or user from the group consisting of: a commissioner, a player, that subscribes to the online gaming and cloud computing services provided by the online gaming platform 101.

In one embodiment, requests 115 are received at, or submitted to, a web-server 175 within online gaming platform 101. The online gaming platform 101 may receive a variety of requests for processing by the online gaming platform 101 and its gaming of the online map-based sports fantasy game competition as described herein in conjunction with use of the gaming database system 130. Incoming requests 115 received at web-server 175 may specify which scoring, gaming, and other configurable settings (e.g., such as maps, users, etc.) are to be applicable for any particular game competition which are then implemented by the online gaming platform 101 as a series of query requests, search requests, status requests, database transactions, graphical user interface requests and interactions, processing requests to retrieve, update, or store data on behalf of one of the gaming participants 105A-C, code execution requests, and so forth, in support of the online map-based sports fantasy game competition as described herein.

Web-server 175 may be responsible for receiving requests 115 from various gaming participants 105A-C via network 125 and provide a web-based interface or other graphical displays to a user device 106A-C or machine originating such data requests 115.

The online gaming platform 101 may implement a request interface 176 via web-server 175 or as a stand-alone interface to receive requests packets or other requests 115 from the user devices 106A-C. Request interface 176 further supports the return of response packets or other replies and responses 116 in an outgoing direction from online gaming platform 101 to the user devices 106A-C. Response packets and responses 116 sent from the online gaming platform to the variously connected user devices 106A-C may constitute a variety of responses 116, such as acknowledgments of receipt (e.g., where no action is taken but confirmation of a request is nevertheless provided) or other interactive responses such as the return of data responsive to a query, generation and presentment of GUI interfaces or other UX/UI and graphical overlays generated by the online gaming platform and pushed to the user devices 106A-C for display, authentication challenges, sponsored advertising content, etc.

In certain embodiments, a client-server architecture may be utilized in which the gaming platform operates upon servers controlled by a particular organization, such as a gaming casino. In such an implementation, it may be desirable that communications between user devices 106A-C and the gaming architecture are transported via a WAN, LAN, WLAN, VPN, or other more restrictive communications network when compared with transport via the public Internet. Regardless of the networking architecture, interactions between the gaming architecture 111 and the communicatively interfaced user devices 106A-C would remain fundamentally the same.

Further depicted here is an authenticator 140 which operates on behalf of the online gaming platform 101 to verify, authenticate, and otherwise credential gaming participants 105A-C (e.g., via their respective user devices 106A-C) attempting to gain access to the online gaming platform 101 and its services.

Scoring regulator 160 operates to capture and implement the manner by which points are awarded, accumulated, tracked, and calculated. Settings selection engine 180 operates to determine implementation of gaming default options and settings or a configurable and permissible variation of gaming options and settings for any given game competition hosted and facilitated by the online gaming platform 101. Mapping engine 195 operates to capture selection, and implementation of a game specified or game required map (e.g., such as geographical maps, fantasy or fictional maps, etc.) for use with respect to any given game competition hosted and facilitated by the online gaming platform 101.

The Map-based Sports Fantasy Game may be presented as an online website by the online gaming platform 101 for competing with a group of other participants (league members or players) in picking (e.g., drafting) a set of teams in a sports tournament, season, week, or day. For example, the online gaming platform may automatically instantiate gaming instances for a previously define player league (e.g., a specified group of player participants) to conduct weekly pick'em games, or such games may be instantiated on a daily, monthly, or seasonal basis, pursuant to game configuration settings and preferences established by a player league's "commissioner."

Certain embodiments described herein relate to a sports or entertainment interactive website with educational properties as implemented and facilitated by the online gaming platform 101. Such disclosed embodiments may be applied to many different sports at any level from national teams to professional leagues to colleges, from local to international scale, and during tournaments or the regular season for a particular sport. The embodiments allow fans, friends, and family members to compete with each other in picking (drafting) teams or individual athletes using actual geographical maps, representative geographical maps, fictional maps, or geographical adjacency relationships, via which participants may then combine elements of fantasy sports, map-based board games, and tournament pick'em contests, implemented and facilitated by an online gaming platform 101. In certain embodiments, geographical adjacency relationships may be depicted in table form, indicating which athletes are available to draft based on a geographical adjacency matrix.

Disclosed embodiments provide system implemented means (e.g., via the gaming architecture 111 of the online gaming platform 101) for an online map-based fantasy sports game involving the teams or athletes competing in a sports tournament or season, such as the college basketball tournament, the World Cup, the National Football League (NFL), or the Olympics, with interactions controlled and facilitated by the online gaming platform.

According to particular embodiments, the gaming participants 105A-C create a player league, with one gaming participant having the role of "commissioner" inviting other gaming participants 105A-C via the online gaming platform 101. In the case of a tournament, play begins after the teams and tournament bracket are announced publicly, e.g., by the National Collegiate Athletic Association (NCAA), Fédération Internationale de Football Association (FIFA) or International Olympic Committee (IOC), etc. In other instances, no such public announcement is required as the teams are known in advance, such as with the case of an NFL football season, where teams do not change from season to season, except on the somewhat rare occurrence of teams moving locations or a league expansion.

FIG. 2A depicts an exemplary starting map 201 game board based on the teams that qualified for a particular year's NCAA Men's Basketball Tournament, in accordance with described embodiments.

As depicted here, teams are located geographically and a geographical map is produced by the online gaming platform dividing the entire region (e.g., USA, the world, etc.) into polygons 205, with one team per polygon, and with the produced map next being pushed from the online gaming platform 101 to the user devices participating in a given game competition.

Each depicted polygon represents the location of a particular sports team, however, these teams may also be academic teams, or different kinds of teams, so long as the location of the team corresponds to the location of a unique geographic coordinate point. Based on the team location, polygons 205 are then formed to divide the entirety of the geographic region into discrete non-overlapping sub-regions or portions, thus producing the polygons depicted here, such as polygons 206, 207, and 208. In this example, the division of the region into polygons assigns all areas to their closest NCAA basketball team that qualified for the tournament based on straight line Euclidean distance.

FIG. 2B depicts another exemplary starting map 202 game board based on the geographic coordinates of stadium locations of the teams competing in a league or tournament, in this example all NFL teams, in accordance with described embodiments.

As depicted here, there are various polygons 205 or regions formed around the depicted points on the map which correspond to the geographic location of different sports NFL stadiums within the United States. In this example, the division of the entire region into polygons assigns all census tracts to their closest NFL stadium based on shortest driving distance on the US road network. In this particular example, the online gaming platform 101 has rendered NFL Stadium Polygons 235 in accordance with the geographical location of such stadiums, however, the specialized mapping engine 195 (refer to FIG. 1) has applied a further refinement to the rendered polygons so as to generate polygons based on driving distances instead of Euclidean distances. Driving distances may be utilized so as to better correspond with those areas having the most fans that are most enthusiastic for a particular sports team as the driving distance based polygon generation is more likely to correspond to the sports stadium easiest to reach for those particular fans.

In alternative embodiments, a 2D map rendering may be generated on the basis of Euclidean distances to NFL stadiums. In yet another alternative embodiment, game board map renderings may be generated by the mapping engine through the use of a cartogram in which the resulting polygon size is proportional to population, thus maintaining adjacency relationships between the states or territorial regions, while also altering the sizing of such regions, for example, by expanding the southern California regions or Northeastern regions of the United States due to those regions having greater population density. Still other map rendering techniques may be applied by the mapping engine 195 based on the particular implementation needs.

In certain regions of the United States, such as within California, there are notably multiple teams with stadiums located geographically near one another, as is depicted by element 231. Stadiums 3 and 4, corresponding to the sports stadiums for NFL teams Los Angeles Rams and Los Angeles Chargers are nearly overlapping on the depicted map due to their very close geographical locations, (e.g., approximately 12.0 miles apart from one another). Each of the San Francisco 49ers and the Oakland Raiders similarly have geographically near stadiums 231, corresponding to polygons 1 and 2. When the polygons 205 are generated, the general West Coast region encompassing California is thus broken into four polygons, each having a somewhat smaller size than is rendered for the neighboring stadiums.

FIG. 2C depicts another exemplary starting map 203 game board based on NFL stadium locations to produce NFL Stadium Polygons 235, in accordance with described embodiments.

For instance, as shown here, there are points corresponding to the Arizona Cardinals at element 232, the Oakland Raiders at element 235, and the San Francisco 49ers at element 236, around which the corresponding polygons are then generated by the mapping engine.

FIG. 2D depicts another exemplary World Cup map 204 and starting game board based on qualifying World Cup countries, in accordance with described embodiments.

For instance, as is shown here, there are multiple qualifying World Cup team polygons 245, each corresponding to a country of the world having qualified to play in the World Cup. Unsurprisingly, Brazil is represented by polygon 246. Further represented in this exemplary game board are Australia 247, Iran 248, Egypt, Saudia Ariabia, Tunisia, Morocco, Senegal, Nigeria, South Korea, and Japan, along with many European countries and a significant number of the South American countries. Despite their best efforts, the USA and Canada sadly are not allocated qualifying World Cup team polygons 245, instead being represented as a shaded, grayed out, or otherwise inactive geographic region on this particular game board. Also illustrated here is how the specialized map engine 195 renders polygons for each qualifying World Cup team while ignoring the non-qualifying teams. Thus, for example, in this exemplary starting game board, Egypt's polygon is adjacent to Nigeria's, which is adjacent to Senegal's, which is adjacent to Brazil's across the Atlantic Ocean.

Figure 2E:
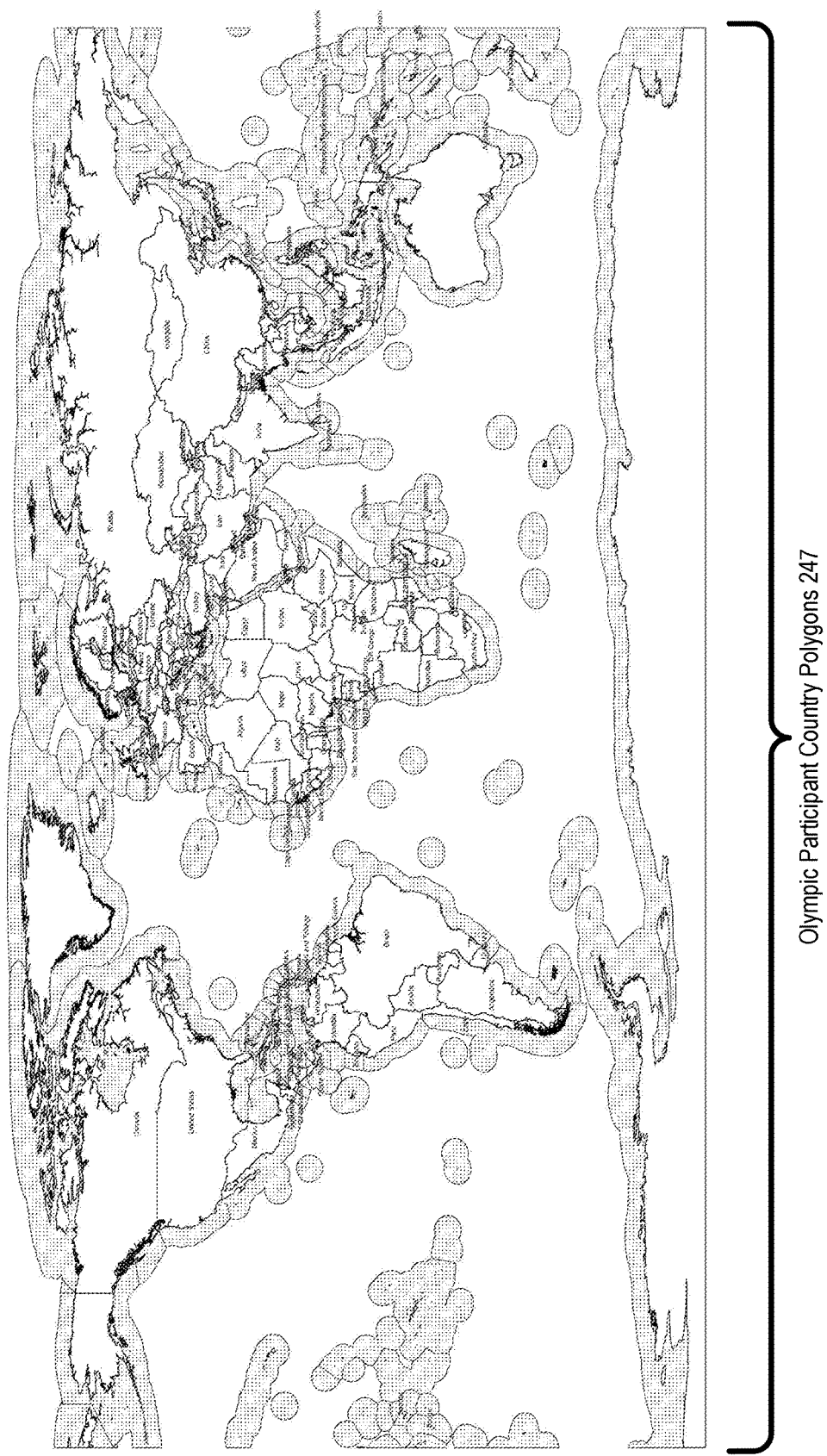
FIG. 2E depicts another exemplary and starting game board based on countries participating in the Olympics, in accordance with described embodiments.

FIG. 2E depicts another exemplary and starting game board 205 based on countries participating in the Olympics, in accordance with described embodiments.

For instance, as is shown here, there are now generated and rendered by the mapping engine, Olympic Participant Country Polygons 247 corresponding those countries participating in a given Olympic Games cycle. Due to space constraints, not all countries are shown. For an actual game map rendering, certain countries may be rendered within a grouping that is collapsed and viewable via zooming with the GUI or in other embodiments certain countries not be represented, depending upon the rules and configuration of the particular game instance.

In this particular example, a 200-mile maritime "Exclusive Economic Zone" (e.g., "EEZ") around each coastal country has been specifically represented, thus providing yet another alternative for depicting polygon adjacency. As shown in this example, in the event that two countries are within 400 miles of each other, then their corresponding EEZs will touch.

For example, consider embodiments for setting up and executing an online map-based sports fantasy game competition based on the Olympic Games as implemented via the systems, engines, interfaces and databases of the online gaming platform 101. As is known, each participating "team" in the Olympic Games fall under the banner of an Olympic Committee. Olympic Committees usually represent a single country (United Nations member States), but may also represent other geographic entities such as territories and independent States that are not United Nations member States. The current Olympic regulations no longer permit the addition of new territories or dependencies of countries to compete independently of their parent country. However, certain territories that gained Olympic participant status before the current revisions of Olympic regulations were grandfathered in and still compete independent of their parent country, notably: Aruba, Bermuda, British Virgin Islands, U.S. Virgin Islands, Cayman Islands, and Puerto Rico. Certain participating Olympic non-UN member independent States include Chinese Taipei, Palestine and Kosovo.

Regardless, each participating Olympic country, territory or independent State represents what may be referred to as a "team" and is thus allocated its own Olympic Participant Country Polygon 247, with non-participating island polygons linked to adjacent coastal countries.

For game instances where all Olympic teams are represented, regardless of status, there will be a minority of Olympic athletes that participate as part of non-geographic entities, such as Independent Olympians or as part of the Refugee Olympic Team (ROT) in the event that such athletes are not able to participate as part of their home State due to political issues or when their home state does not have an active national Olympic Committee due to suspension or other reasons. Such non-geographic individuals and entities may be represented in graphical or table views, or on a separate portion of a map view or may alternatively be linked to the map and labeled accordingly, thus providing a graphical representation of these non-geographic based "teams."

Other athletic sporting competitions as well as non-athletic sporting events (e.g., trivia, academic, or otherwise) having teams based in a particular city, college, or other location may be represented as points on a map, similar to the manner in which the NFL teams are presented at FIGS. 2B, and 2C.

Regardless of the entity or "team" represented, polygons are defined around these point locations, with each polygon representing the geographic coverage of one team or one team's corresponding geographic point location, be that a stadium, college, or some other identifiable geographic location. The resulting map rendering having the polygons formed thereupon then serves as the online game board generated or produced by the online gaming platform and subsequently stored by the mapping engine of the online gaming platform 101 for use in actual game-play.

FIG. 2F depicts a GUI table 206 of the game board used for tracking player or team selections or "drafts," in accordance with described embodiments.

In addition to the graphical game map, there is further depicted to the player's game board various data, statistics, selections, and game status information, as is shown here.

According to such embodiments, players in fantasy leagues may meet online at a given time to select or otherwise "draft" a set of teams and build a regional territory on the game board map using the polygons, with such a regional territory being formed from multiple such polygons. For instance, in the first round of the draft of an exemplary game instance, players take turns choosing one polygon that represents a home team or seed region. The order in which players draft can be generated in random order or assigned by the commissioner. Then, using a snake-style draft order, in which the player who chose last in Round 1 gets to choose first in Round 2, players take turns choosing additional teams with the stipulation that they only choose a polygon that is adjacent to the polygon of one of their previous selections. In other embodiments, players may select their first "seed" region based on, for example, prior wins or some other pre-determined criteria. And in yet other game instances, it may be specified that non-contiguous polygons are selectable under certain circumstances (e.g., where a player is boxed-in and therefore has no other adjacent available polygons from which to choose, etc.). Implementation of various embodiments and game rule variations are thus possible based on varying these and other rules.

For instance, an initial seed region 213 is shown here at the left-most column. The first row presents the player's team name 211 (e.g., the player or the player's avatar or nickname or player handle that is participating in the game instance) and the second row of the table indicates the player's unique team number 212, such as Team 1 through Team 7, as shown here.

In this particular game instance, a fantasy sports game instance has been generated based on the March Madness NCAA basketball college teams.

Once the draft is completed, the online gaming platform 101 tracks the results of the tournament or season and awards points to players accordingly via the scoring regulator 160. Results of the ongoing tournament are tracked and reported in table, graph, and map formats available to and pushed to the user devices 106A-C by the web-server 175 of the online gaming platform 101. When the tournament is over, a winner is declared. Historical statistics for each league are maintained from season to season and sport to sport.

Other non-athletic sporting applications may be implemented through practice of the disclosed embodiments for use within the education space. For example, students may draft regions and be awarded points as academic events and milestones occur over time.

According to one embodiment, fans, students, friends, and family members (e.g., depicted here as gaming participants 105A-C) may compete with one another in picking sports competition results using a map. For example, players may take turns choosing pre-defined polygons on a geographic map to create their territory, in the manner depicted above.

Using the March Madness competition game instance as shown here, there is further depicted the various seeds (221 through 227), with one seed allocated to each player's team number 212, and then subsequent rounds are iterated through, thus permitting the player to select additional teams. Certain statistics are presented below according to this specific embodiment, including the average seed 231 value for each player, the total number of teams 232 allocated, picked, or drafted by each player, the number of certain ranked seeds, such as 1-4 seeds 233 or 1-8 seeds 234, as picked by each player, and the highest seed of any round, which may be set apart by bold text or color, shading, or some other graphical indication.

Additionally depicted on this chart are certain "boxed-in" teams, as noted by elements 229 and 230. Depending upon the settings of the game instance, it may be that a player is boxed-in, and loses a turn, such as what is indicated for Team 4, but is then permitted to select again, or it may be that a player is boxed-in and then prevented from making further selections as indicated by element 230. Alternatively, a boxed-in player may be allocated an unpicked team, such as "UCLA" in this example (e.g., rather than the player affirmatively choosing or drafting a team) as a deterrent by the game rules to becoming boxed-in.

Consider another example in which the NCAA college basketball tournaments, the World Cup, NFL, cricket, English Premier League, or the Olympics are utilized as the foundation for the online gaming competition. The means by which one drafts their set of contestants or teams (e.g., a collection of polygons or territories) is geographical. Once territories are created through the draft, league members then accumulate points based on results of the tournament or season, and at the conclusion of a tournament or season, a league champion is declared based upon accumulated points.

In the map view for a regular season, in which no NCAA or NFL team is ever knocked out by any other NCAA or NFL team, points accumulated by each team may be represented via a 3-dimensional height of the polygon, while victories by one color over another color may be illustrated with symbols with the winning team's color placed interior to the losing team's polygon.

According to another embodiment, the online gaming platform 101 may be utilized as an on-demand cloud based service which is utilized from a player's point of view, via the user devices 106A-C. For example, in one embodiment, the user or player may adopt or accept default settings, whereas in other embodiments, the user or player may specify and select various optional game settings, scoring parameters, rules, etc.

Creating and joining a league: According to one embodiment, a first participant (identified as having the role of Commissioner) either logs in to an existing account or creates a user name and password (if the first participant has not previously created an account) and then clicks on 'Create League'. The Commissioner may choose to accept the default settings and thus apply a default set of game "rules" or alternatively, the commissioner may click on 'change settings' to alter the rules and scoring system, as is described in greater detail below.

The Commissioner (e.g., one gaming participant having the role of "commissioner") next clicks on 'Invite League Members' and enters the email addresses of friends, family, and colleagues, etc. Recipients of these emails may elect to create profiles and join the league. Player participants 105A-C having the role of league members, also referred to as "players," then each chooses a team name. For instance, the "players" for this particular game instance have chosen the player team names 211 as "My Old Kentucky Home" for Team 1, and "Duke of March" for Team 2, and "Dunkapolis" for Team 3, etc.

While black and white textures are utilized for the Figures of this document, in actual implementation, it is more likely that colors will be utilized. Thus, a map color for each player would be assigned by the mapping engine 195 or selected by the commissioner via GUI options presented by the mapping engine 195. For instance, Team 7 identified as "The Leftovers" may be allocated or assigned a green color, whereas Team 6 identified as "How the West Won" may be identified via a light-blue color, etc.

The Commissioner further sets the date and time of the league draft via the settings selection engine 180, with the league draft being configurable by the commissioner, so long as the draft is scheduled and concluded before the first game begins.

Alternatively, a participant may create a profile and click on 'Join Random League'. Users may alternatively search for a random league based on a day and time for the draft. Each random league will combine a given number of players into a league using the default settings as applied and adopted through a GUI presented by the settings election engine 180. When a league fills up, a new random league is created by the online gaming platform for that draft day and time.

Leagues are created before the teams in a tournament are announced, but the draft is not held until after the teams are announced, such as when World Cup berths (e.g., groups) are announced, or when the NCAA tournament brackets are announced. For established amateur and sports regular seasons, such as the NFL, the English Premier League, or the NCAA basketball regular season, drafts may occur anytime because the teams or countries are known in advance.

Although the Olympics are an established sport with a regular season (taking place every four years), the list of participating states and territories may change due to non-qualification, States embargoing the Olympics, or other geopolitical reasons. Participating States and territories are usually announced in the years and months preceding the event as they qualify to compete for various Olympic sporting events. Such modifications may be tracked and stored by the mapping engine 195, thus permitting future generated or produced geographical and game based maps to reflect the current actual conditions for various sporting competitions. According to certain embodiments, the mapping engine 195 automatically retrieves the relevant information (e.g., qualifying World Cup teams, participating Olympic countries, etc.) from existing 3rd party databases or other sources, such as news repositories, web indexes, public facing web widgets, etc.

Figure 2G:
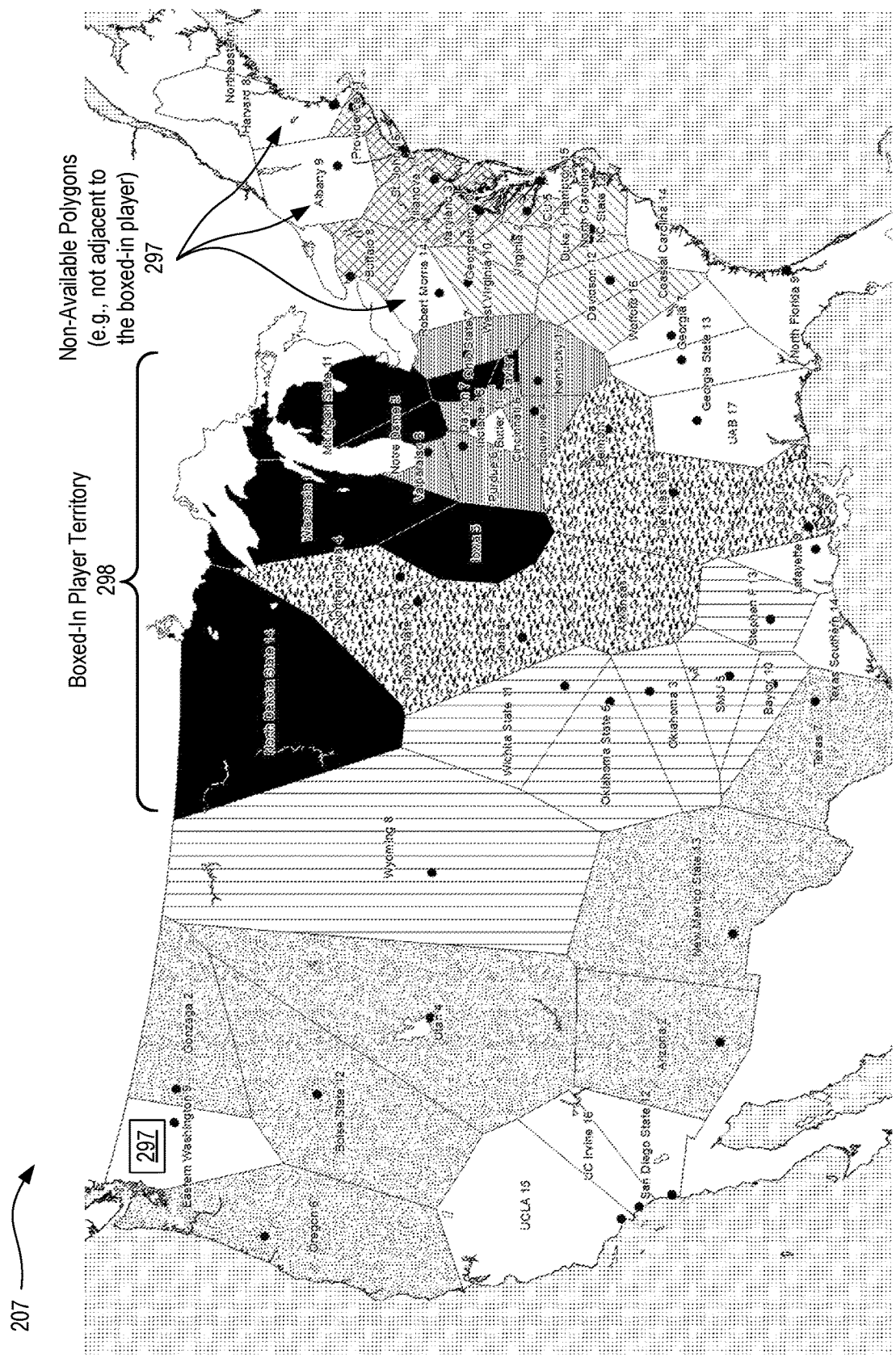
FIG. 2G depicts an exemplary game board map depicting a boxed-in player, in accordance with described embodiments.

FIG. 2G depicts an exemplary game board map 207 depicting a boxed-in player, in accordance with described embodiments.

For instance, there is now depicted, a boxed-in player territory at element 298, denoted by the black shading. The player may have additional draft picks remaining in subsequent rounds, however, the unselected polygons shown here in white are not selectable by this player under default rules. This is because only non-contiguous polygons 297 remain on the map game board, such as Albany, Harvard, Eastern Washington, UCLA, UC Irvine, etc.

According to a particular embodiment, the online gaming platform and specifically the mapping engine may integrate customized player icons, avatars, pictures, or other player selectable and player configurable graphics into the game board map display. For example, a player participant's picture may be applied to the territorial region colonized by that player, or a sports athlete's helmet or jersey may be displayed over a territory of polygons or within individual polygons, signifying either the player participant that owns or controls that particular area of the game board map or alternatively used to signify a drafted team or a drafted sports athlete from that particular polygon. Such customization increases the interactivity between the online gaming platform and the individual player participants, thus encouraging greater use and engagement from the player base community.

FIG. 2H depicts another exemplary starting game board 208 based on the NCAA Men's Basketball Tournament, in accordance with described embodiments.

Consider again the exemplary game instance based on the NCAA Men's Basketball Tournament. Such a Tournament is an annual national championship event (single-elimination tournament) held during the Spring season between the NCAA college basketball Division I schools. The NCAA Division I schools compete at the highest level of intercollegiate athletics and generate significant economic activity and draw millions of viewers and sports enthusiasts.

According to such embodiments, participating teams for a given tournament (such as the 2014-2015 season) may thus be geographically depicted on a map of the United States and divided into exemplary set of NCAA Team Polygons 261, which represent all teams that qualified for the NCAA Tournament, by the mapping engine 195 of the online gaming platform 101 (see FIG. 1), with each polygon representing a NCAA Division I team by including the home city of that team and to the exclusion of any other home city for any other participating teams within that polygon. Stated differently, no NCAA Team Polygon 261 may incorporate the city of any other NCAA team represented within the game instance and every represented NCAA team must correspond with exactly one NCAA Team Polygons 261. This implementation is similar to that which is shown at FIG. 2C for the NFL teams, however, rather than the NFL Stadium Polygons 235 depicted at FIG. 2C corresponding to the various NFL stadium locations across the United States, there are instead the NCAA Team Polygons 261 corresponding to the city within which each college team plays or alternatively, corresponding to the specific geographic location (e.g., campus) of the college associated with such NCAA teams. Refer also to FIG. 2A, in which the depicted polygons are generated based upon the geographic location of NCAA teams participating in the "March Madness" tournament.

The quantity of total seeds may vary depending on the implementation, teams, and regions represented. In this particular NCAA specific example, NCAA Team Polygons 261 are represented by numeric identifiers here due to space constraints. In the actual implementation, the NCAA team names would also be displayed next to the numeric identifier for each team. Regardless, as shown here, the numeric identifiers range from Kentucky being one of four teams with numeric identifier (seed) 1 to Northeastern being one of four teams with numeric identifier (seed) 17 representing the recently instituted "play-in games." However, these seed numbers are merely an example and variation is expected.

In sports leagues or tournaments where teams or individual contestants are located at particular points (e.g., cities, colleges, schools, stadiums, etc.), the points are shown on the map as dots. The online gaming platform 101 creates the polygons 205 via the mapping engine 195 around each point such that all points in any polygon are closest to that team's location, and all points in other polygons are closest to another team's location. These polygons are known in geography as "Thiessen polygons," and the map of the polygons is called a "Voronoi diagram."

According to the current embodiment, Thiessen polygons are not equal in size and may incorporate a broader geographic area than the team's home city itself and may include portions of neighboring states, neighboring countries such as Canada or Mexico and bodies of water such as the Atlantic Ocean.

If the teams represent pre-established regions with sufficient connecting boundaries for gameplay, such as states, provinces, districts, or countries, then point locations are unnecessary and the geographic shape of the states, provinces, countries, or other districts may instead serve as the polygons 205, which again would be generated and applied to the map by the mapping engine 195. Ultimately, a visual representation of the teams belonging to the gaming participants (e.g., players, users, etc.) are required to be represented as polygons 205 so as to conduct the draft, given that the polygons 205 on the map serve as the game board or draft board, as well as serve as selectable and interactive elements available to the player via the GUI.

Clicking on any polygon 205 for any of the above described maps (including the NCAA Team Polygons 261) causes the online gaming platform 101 to push display information corresponding to the team represented by the clicked or selected polygon 205 from the mapping engine to one of the user devices 106A-C having initiated the click event on the respective polygon 205 (and thus triggering an API or GUI query event by the user device), with such information returned responsive to the click event including, for example, a win-loss record for the team, seeding of the team, power ranking for the team, team logo, etc.

In such an embodiment, all polygons are initially shown in white on the map game board at the start of gameplay and indicating that such polygons 205 have not yet been modified or colored in based on gaming participant events, selections, rules, and other gaming criteria as managed by the settings selection engine and as presented graphically to the user devices 106A-C via the mapping engine 195.

The draft: When entering the online draft room, graphically presented to the user devices 106A-C from the gaming platform 101, a primary GUI shows a map divided into polygons, while a small inset GUI overlay depicts a table view (refer again to FIG. 2F which illustrates such a table view). Participants may shift between table and map views via the GUI navigation options, or open a second window to access a different GUI view.

With reference again to the table view at FIG. 2F, the online gaming platform implements and carries out an interactive snake draft amongst the player participants, resulting in a 7-player draft, in accordance with described embodiments.

Each player participant or league member (also known as a player or Team) has a chosen league or player's "team name" 211, has been assigned league team number 211 by the online gaming platform, and has been assigned league team color or shading or texture. For example, the league team My Old Kentucky Home is assigned as Team #1 with the color green. Each player's league team consists of 9 NCAA Division I men's basketball teams (e.g., colleges), as is indicated by row 3, with the specifically selected teams populating rows four through to the end, also summarized via the table below which depicts the "Number of Teams" at element 232 as nine (9) teams per player team. In certain embodiments, different player teams may have an unequal quantity of selected polygons, thus resulting in more or fewer college teams as part of that player's team or in the case of other sports or configurations, different player participants may have more or fewer selected athletes on their team rosters or more or fewer countries, etc.

In the example depicted here, each NCAA Division I team is also assigned a seed number as depicted by elements 221 through 227. Seeding in the NCAA Basketball Tournament selection process involves a committee voting on teams four at a time to create a seed list. The teams to be seeded have earned the automatic qualifier from their conference or have been voted into the tournament as at-large teams. The top four teams on the first seeding vote make up the initial one line (the four No. 1 seeds). The highest seed number for each round (Highest Seed of Round) 235, along with its associated college (row 3 of the table) will be bolded or otherwise highlighted via the GUI for the player. For each player, the average seed number 231 of all their selected NCAA teams/colleges is calculated, along with the number of their colleges that fall into the No. 1-4 Seeds 232 and the No. 1-8 Seeds 234.

The average seed number 231 ranges from 7.22 to 9.56 for the 7-player snake draft as is shown here. Notably, the player team "How the West Won" (Team 6) has been calculated as having the set of teams with the highest average seed number of 9.56 and conversely, the player team "The Leftovers" (Team 7) has been calculated as having the set of teams with the lowest average seed number of 7.22.

The number of colleges coming from the 1-4 seeds 233 ranges from 1 to 3 per player, with "Tornado Alley" (Team 4) having only 1 college (Oklahoma) from the No. 1-4 seeds and several players having 3 colleges from the No. 1-8 seeds. The number of colleges coming from the No. 1-8 seeds 234 ranges from 3 to 7 per player, with "Dunkalopolis" (Team 3) having only 3 colleges from the No. 1-8 seeds 319 and "Threez Wiz" (Team 4) having 7 colleges from the No. 1-8 seeds 234.

Players are organized into a draft order, which may be randomly generated or set by the player participant having the role of Commissioner. The draft proceeds in a snake fashion. For example, teams 1-8 in the first round, next teams 8-1 in the second round, and so on. Thus, with a "snake" or "serpentine" draft, player participants take turns drafting players in a "snake" like method, that is to say, the player participant who picks first in the odd rounds picks last in the even rounds, in the interests of fairness.

A countdown marks the start of the draft. Members take turns clicking on one map polygon at a time to choose teams. Based upon the particular rules for that gaming instance (e.g., default rules or commissioner selected rules), each participant player may be limited to, by way of example, one minute as a time limit, in which to make their selections, with a countdown clock and warnings shown. If the time limit is exceeded, the scoring regulator 160 of the gaming platform 101 may automatically identify and select the highest-ranked adjacent team automatically for the player in the interest of advancing gameplay or may alternatively randomly select any adjacent team and allocate that selection on behalf of the player participant as if the player had selected that polygon during the players team. In such a way, even if a player ignores or abandons the game instance operated by the online gaming platform, then the game would nevertheless continue to advance (subject to the time limits) so that the other remaining participant players may continue with their draft selections.

In the first round, gaming participants choose their "home team", which serves as their anchor point or initial seed region 213. In the second and subsequent rounds, gaming participants may only choose a team whose polygon is adjacent to one of their previously selected polygons. In this way, gaming participants gradually build up contiguous regions of neighboring teams to form a territory. The gaming platform 101 will not allow a player to choose a non-adjacent team when contiguous polygons are available for selection according to default rules for exemplary implementations, though the defaults are configurable by a system administrator or a "commissioner" player participant via the settings selection engine 180 according to certain embodiments.

It is possible for a member's territory to become completely boxed-in 229 and 230, with no available teams adjacent to one's existing territory, as seen with Tornado Alley (Team 4) in rounds 8 and 10 and Threez Wiz (Team 5) in Round 9. In the default rules, this league member loses a turn, and does not choose a new team in that round of the draft. In the following round, the player chooses any polygon to restart a new, non-adjacent territory. This is represented by Tornado Alley (Team 4) selecting Boise State in Round 9 and Hampton in Round 11, and Threez Wiz (Team 5) selecting UCLA in Round 10. Variations of this rule are available via the settings selection engine 180, to be set by the gaming participant having the role of a commissioner.

As players choose teams (called colleges according to the exemplary embodiment depicted here) and expand their territories, the map colors their polygons with the color of their league team (player color), and various statistics are compiled by the online gaming platform on behalf of each player and that player's growing territory of polygons. The selected polygons that are chosen or associated with each player are tracked by the mapping engine 195 and displayed in real-time to the participant player making the selection as well as to opponent participant players within a common league.

The final number of teams in each league member's territory is equal to the total number of teams in the sports league or tournament (n) divided by the number of league members (m), rounded down to the nearest smaller integer, that is, INT(n/m). Remaining teams are not drafted onto any league member's territory, although such rules and settings are configurable by the commissioner in accordance with alternative embodiments.

For instance, with 32 team-countries in the World Cup and 5 league members playing, each league member would have 6 team-countries, making 30 total team-countries with 2 team-countries left over, since INT(32/5)=6. The 2 leftover team-countries would not be drafted into any league member's territory, although such rules and settings are configurable by the commissioner in accordance with alternative embodiments.

The final set of teams on each league member's territory is colored on the map depicted by the game board generated by the online gaming platform 101.

Accumulating points and winning the contest: Once the draft is completed, the season or tournament plays out and the online gaming platform 101 tracks the results and awards points to league members accordingly. Rules affecting scoring, allocation of points, and tracking of the various player's scores are managed, monitored, and tracked via the scoring regulator 160. In the default rules, no trades or waiver pickups are allowed.

The default point settings are different for different sports competitions and for different formats. For instance, for the Olympics, the default points are, by way of example, 5 points for a gold medal, 3 points for a silver medal, and 1 point for a bronze medal. For the World Cup, the default points, again by way of example only, are 3 points for a win and 1 point for a draw, with additional points earned for each round of the knockout stages reached. For example, the scoring regulator 160 may track and accumulate 3 points for reaching the round of 16 and 6 points for reaching the quarter-finals and 9 points for reaching the semi-finals and 12 points for reaching the final, although other variations are configurable by the player participant having the role of commissioner or by a system administrator for the online gaming platform 101.

For the NCAA basketball tournament, the default points awarded may be, by way of example, 1-2-4-8-16-32 for a win in each of rounds 1-6, respectively, with 1 bonus point for an upset where a lower seed beats a higher seed. In regular season sports leagues, such as the NFL, NBA, NHL, or MLB, the default points for wins, losses, ties, or shootouts vary by league and sport, with bonus points for making the playoffs. Points are awarded to the player whose territory contains the team according to such embodiments. The gaming platform 101 settings allow for flexibility in point values and bonus points, including winner-take-all configurations via the settings selection engine 180.

For NFL related game instances, the scoring regulator 160 tracks the results of all 32 NFL teams and allocates points accordingly. The gaming instances are ideal for smaller groups of players and may be limited to regular season games or playoffs or span the entire season of games and playoffs. Exemplary scoring may be applied for NFL related game instances as follows: The scoring regulator 160 may allocate 1 point per regular season win, 1 bonus point for Wild Card teams, 2 bonus points for division winners, 3 bonus points for earning a bye, and 2, 4, 6, or 10 points per win in each subsequent round of playoffs. Over the course of the season, the map will further display each team's currently accumulated value of points on the basis of 3-D height, cartogram size, or color intensity. For NFL related game instances, default rules allow for trades during the season, or the rules may allow for the trade of any teams for any other teams, or in certain configurations, the rules engine may enforce maintained adjacency, even for team trades.

For World Cup related game instances, the scoring regulator 160 tracks the results of the contests and allocates points accordingly. For World Cup games, an adjacency matrix is determined by land borders between countries or alternatively, by artificially establishing adjacency between two countries ignoring non-qualifying countries, water bodies, or land borders between them. Scoring for World Cup related game instances may be applied and managed by the scoring regulator 160, as follows: The scoring regulator 160 allocates 3 points per group win, 1 point per group tie, 1 bonus point for advancing, 2 bonus points for winning group, and the scoring regulator further allocates 5, 7, 9, and 12 points for subsequent rounds. Over the course of the tournament, the map displays a country's number of points on the basis of 3-D height, cartogram size, or color intensity. Unlike other sports, a "no trades" rule is established by default, however, this may be user-modifiable.

For Olympics related game instances, the scoring regulator 160 tracks the results of the contests and allocates points accordingly. An adjacency matrix for such games is determined by land borders between countries or alternatively, by artificially establishing adjacency for countries separated by water, such as if their 200-mile maritime Exclusive Economic Zones (EEZs) are adjacent. Scoring for Olympics related game instances may be applied and managed by the scoring regulator 160, as follows: The scoring regulator 160 allocates on the basis of a Fibonacci weighted point system (3:2:1)—gold 3 points, silver 2 points, and bronze 1 point, or alternatively on the basis of an exponential weighted point system (4:2:1)—gold 4 points, silver 2 points, and bronze 1 point, or alternatively on the basis of the London 1908 weighted point system (5:3:1)—gold 5 points, silver 3 points, and bronze 1 point, or alternatively on the basis of an LOF weighted point system (5:3:2)—gold 5 points, silver 3 points, and bronze 2 points, or alternatively on the basis of the Topend Sports weighted point system (6:2:1)—gold 6 points, silver 2 points, and bronze 1 point, or alternatively on the basis of a per-capita demographic ranking—number of medals is divided by the population of the country, or alternatively on the basis of a per-GDP demographic ranking—number of medals is divided by the gross domestic product (GDP) of the country. Over the course of the Olympic games, the map displays a country's number of points on the basis of 3-D height, cartogram size, or color intensity.

Results of the ongoing tournament or season are tracked and reported in table, graph, and map formats and pushed to the user devices 106A-C via the online gaming platform 101. Functionality will vary depending on whether it is an elimination tournament or regular season, as described in greater detail below.

According to particular embodiments, there is further depicted to the player's gaming interface a colorized bracket representing the tournament results. For example, consider Duke's winning 2015 NCAA tournament. If player 1 selects drafts duke as their team and is assigned the color green by the gaming platform, then each round of tournament play would depict Duke color coded with green, thus representing player 1's selection, and the final completed bracket would additionally depict Duke in the center as both having won the tournament and also color coded green, signifying that player 1's team selection (in this case Duke) won the tournament. This is unique compared with other fantasy sports solutions because prior systems lacked the notion of exclusivity, whereas the described embodiments permit a player, such as player 1 in this example, to draft and exclusively own and control a particular territory. Other players' colors would also be represented, and thus, it would be depicted on the colorized bracket view that, for example player 2's selection of Robert Morris University in the first round of 2015 tournament play not only lost, but is signified as, for example, red in color, thus associating the loss of Robert Morris University with player 2's assigned color of red. This system of colorization thus permits one to easily track the winning teams visually through the bracket view while maintaining information, such as which teams lost and which players those winning and losing teams were associated with as part of the prior draft, based on associated colors for such players.

Figure 2I:
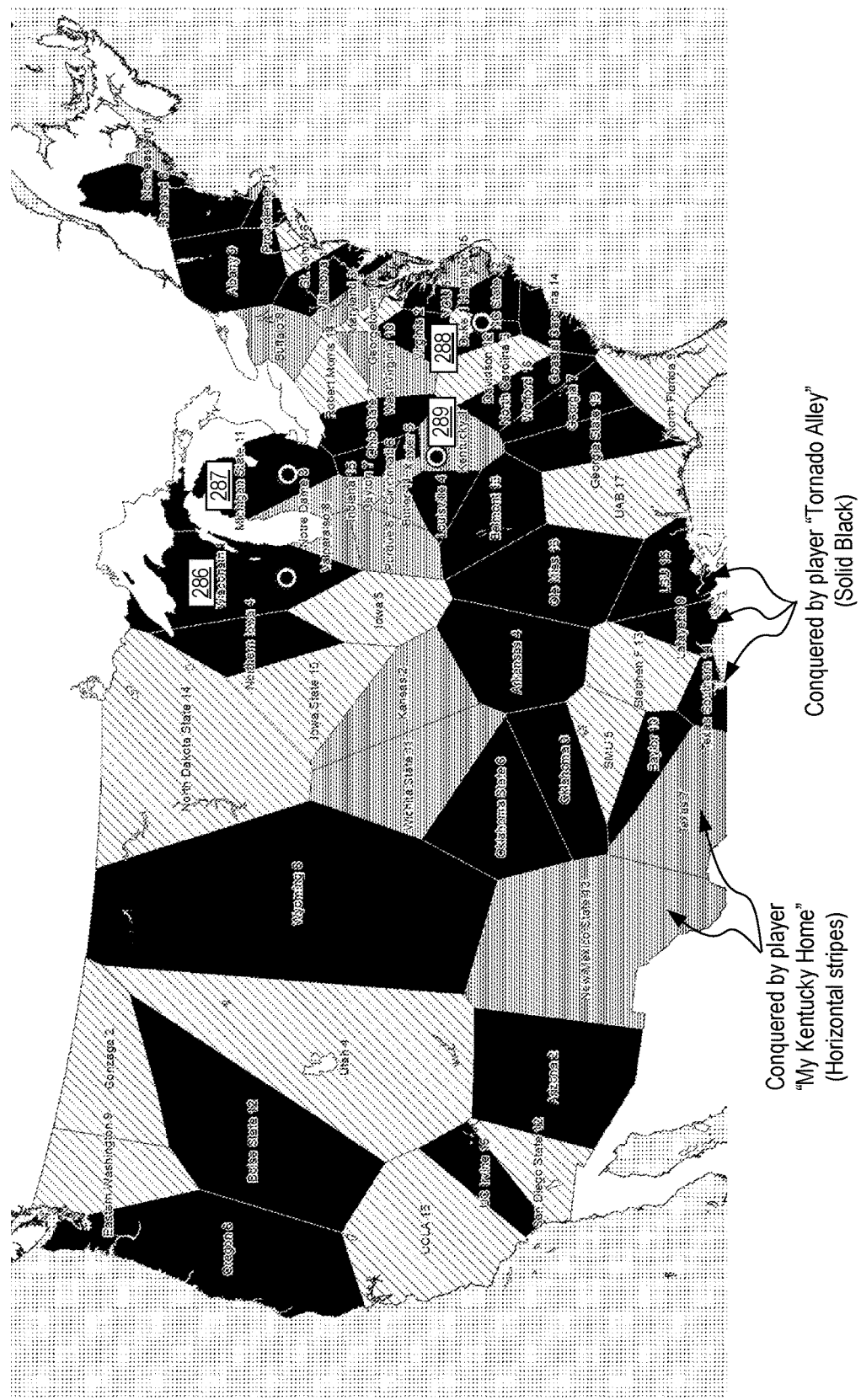
FIG. 2I depicts an exemplary game board map depicting the colonization of an NCAA map, in accordance with described embodiments.

FIG. 2I depicts an exemplary game board map 209 depicting the colonization of an NCAA map, in accordance with described embodiments.

As shown here, the map has been narrowed down to the final four teams in the NCAA tournament. In accordance with such embodiments, as depicted in this map view for an elimination tournament, if one team defeats another team and knocks them out of the tournament, different types of shading or boundary line width or color may be utilized to illustrate the original territories and the takeover of polygons. After completion of the draft of NCAA basketball teams as shown via the snake draft table as depicted at FIG. 2F, the 2015 basketball tournament took place. After 4 rounds of basketball play, the Final Four teams have been determined: Wisconsin 286, Michigan State 287, Duke 288, and Kentucky 289. Wisconsin 286 and Michigan State 287 had both been drafted by Tornado Alley, the player that had gotten boxed in (refer to FIG. 2G, element 298), showing that it may have been worth the risk of getting boxed in to get these teams. Kentucky 289 had been drafted by the player identified as "My Old Kentucky Home," and Duke 288 had been drafted by the player identified as "Duke of March." After 4 rounds of play, the map rendered by the mapping engine depicts that these 3 players take over all of the teams. Notably, the player identified as "My Old Kentucky Home," shown by horizontal stripes on the map, colonizes all of the polygons of teams in the Midwest bracket, which was won by Kentucky. The striped texture is applied to polygons of teams directly beaten by Kentucky, or teams that were beaten by teams that were then beaten by Kentucky, and so on. The player identified as "Duke of March," shown in white on the map, colonizes all of the polygons of the teams in the South bracket. Tornado Alley, shown in black on the map, conquers all the polygons of the teams in the East and West brackets, which were eventually won by Michigan State and Wisconsin. Duke eventually went on to win the 2015 NCAA Men's basketball tournament, and the entire map would then be colored white. These textures would likely be applied as colors in the game application.

During the phase of points accumulation, the game interface would also show the 64-team bracket. As tournament teams beat other teams, a coloring process would be applied to the winners of tournament games. For instance, in the 2015 tournament, Arizona, owned by the player identified as "How the West Was Won," beat Texas Southern in their first round game. Arizona would be shown as the winner of this game by advancing to the second round of the bracket, and would be colored with the team color of "How the West Was Won." This is a unique innovation for bracket-picking games, made possible because in the map-based draft, NCAA teams are owned by only one player participant.

Boxed-in rules may vary based upon the commissioner's preferences and the rules selected. For instance, it is possible under certain rules for a player to end the draft with a large territory of multiple contiguous polygons and then a smaller territory which is not connected with the first contiguous territory which is formed from one or more additional non-contiguous polygons. This would occur for a player that becomes boxed in, and then in a later round of the draft, that player selects a non-contiguous polygon. Alternatively, the players may be prohibited from selecting non-contiguous polygons during any draft round under any circumstances, in which case, only contiguous territories would appear upon the game board.

In an exemplary graph view, points are accumulated in line graphs with games played or round of the tournament on the x-axis and cumulative points on the y-axis, with one colored line for each league member.

In an exemplary table view, various cumulative statistics are tracked, including fantasy points, wins, losses, ties, winning percentage, upsets of higher seeds, total goals for and against, etc. When the tournament or season is over, the league member with the most points is declared the winner. If the league is renewed in subsequent seasons or for other sports, historical records are maintained by the gaming platform 101. Historical statistics for each league are maintained from season to season and sport to sport.

Optional settings: The gaming platform 101 further permits the gaming participant having the role of commissioner to alter settings in several different categories relating to the draft via the settings selection engine 180, thus permitting use of optional settings (e.g., non-default settings) in accordance with the described embodiments.

Draft order settings: Draft order settings may be determined by random or manual settings. With the manual setting, the gaming participant having the role of commissioner enters the draft order, thus configuring the game execution by the online gaming platform 101 via the settings selection engine 180. Because there are strategic advantages and disadvantages to choosing earlier or later, an optional check box allows for draft-order trading among players, with such draft-order trades required to be completed prior to the start of the draft according to such embodiments where draft-order trades are permissible according to game rules and game configuration settings.

For example, the player with the third overall pick of the first round could propose to swap positions with the player with the last overall pick. If the player with the last overall pick accepts the proposition, the draft positions of the two players are swapped.

A draft-order pre-draft may be selected, in which players take turns choosing their draft positions. The pre-draft draft order is randomly assigned by the online gaming platform 101 according to certain embodiments. For instance, the player picking first in the pre-draft could opt to choose first, second, or last in the real draft.

Another variation of game rules and game settings predetermines the initial seed regions as the top seeds. For instance, in the NCAA basketball tournament, if there are 8 league members, each of the No. 1 seeds and No. 2 seeds may serve as a starting polygon for each player, as each have 4 teams for a total of 8 teams. With 10 league members, the two highest ranked teams from the No. 3 seed would also be included.

Alternative embodiments permit the player choosing or being assigned the team with the lowest-ranked seed number to have the first choice in the second round, and so on, while the player with the overall favorite (top ranked or highest-seed number team) receives last choice in the second round.

Other settings for the draft include a time limit mode and an auto-pick mode for absent players or players who go over the time limit, enforced by the settings selection engine 180.

Boxed-in settings: Additional configurable settings control permissible player selection when no adjacent polygons are available for selection during the draft by a player whose turn is active to add a polygon to their territory. This event is referred to as being "boxed-in" as described above and as illustrated in subsequent figures. According to certain embodiments, a default setting enforced by the settings selection engine 180 requires that a player miss their turn in the round that they are boxed-in, and then permits the player having missed their turn to select any available polygon (including non-contiguous polygons) in a subsequent round. Alternative embodiments permit configurable settings to be set by the gaming participant having the role of commissioner, including: a boxed-in player's territory being considered final, meaning the player cannot pick additional teams once enclosed (e.g., boxed-in); varying the number of turns a boxed-in player must skip (0, 1, or 2); defining which teams a player is able to pick after skipping the required number of turns, with options including: selecting any previously un-chosen polygon, selecting the lowest-ranked remaining team's polygon, or selecting the team's polygon most-distant from other player's territories; and enforcing a rule defining whether teams that are boxed-in and lose turns are permitted to make up those turns with non-contiguous polygon picks after all other players have filled out their teams or defining that players losing a turn simply end up with fewer teams in their final territory. Other variations may be defined by the gaming participant having the role of commissioner in accordance with practice of the disclosed embodiments.

Scoring systems: The gaming participant having the role of commissioner may further adjust the scoring system in a variety of ways. Embodiments will vary by sport and by league or tournament format. In addition to simply modifying the points for any default setting, other embodiments are possible. In one embodiment, tournament upsets by a lower seed over a higher seed are awarded bonus points equal to the seed differential. For example, a 15 seed beating a 2 seed would be awarded 13 bonus points which are tracked and enforced by the scoring regulator 160 of the online gaming platform 101. In another embodiment involving a regular-season league, bonus points may be awarded for making the playoffs or earning a "bye" or home-court advantage. In yet another embodiment, a winner-take-all format is followed, in which the player whose territory contains the champion of the sports league or tournament wins the league.

FIG. 2J depicts an exemplary ending map 210 game board based on NFL team win results, in accordance with described embodiments.

At the end of the season, the results are graphically depicted on the game board map for the player participants. Shown here is an example of how players choose regions of teams (e.g., territories formed from multiple polygons) to compete over the course of a season based on team wins. The textures depicted (e.g., horizontal stripes, diagonal stripes, dots and cross hatches) show which teams were chosen by which player (e.g., Mike, Frank, Richard, Lee etc.).

Wins are shown by the darkness of the shading. In this depicted example, the winningest teams were the Ravens, Patriots, Packers, and 49ers.

The stars indicate each player's "home" territory corresponding to which team each player chose in the first round. Each star icon depicting a player's home territory also corresponds to an NFL stadium location, thus identifying specifically which NFL team was drafted in the first round by each player. In this case, the Arizona Cardinals 241, the Baltimore Ravens 239, the Buffalo Bills 240, and the New Orleans Saints 238, were drafted first, and then each player's region was expanded from these initial seed polygons. This depiction is merely exemplary as, in reality, there will be more "winning" teams per round. For instance, it is theoretically feasible that, given sufficient time, weather conditions, and alignment of cosmic energies, the Cleveland Browns could register the most "wins" for a particular season, in which case, the texture intensity or other indicator would then be rendered by the mapping engine within the corresponding NFL team polygon for the Cleveland Browns.

Additionally depicted on the map is a representation of the number of wins by each team, in which larger circles represent more wins for that particular team and smaller circles depict fewer wins for that particular team. For instance, the San Francisco 49ers have a larger circle and thus more wins when compared with the Detroit Lions.

As players choose regions of teams to compete over the course of a season, the chart will adapt the graphical depiction so as to reflect the number of team wins.

Figure 3A:
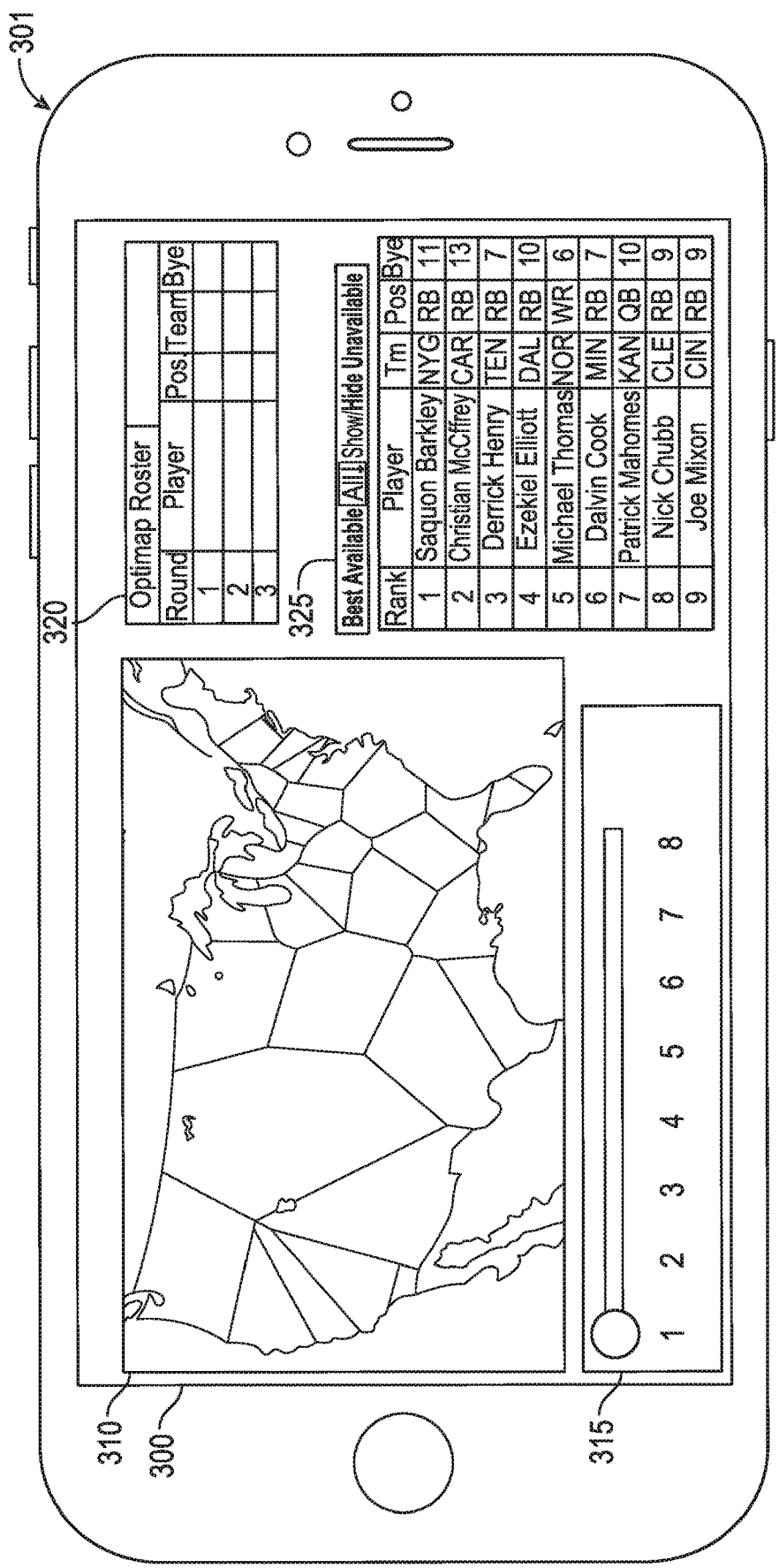
FIG. 3A depicts an exemplary graphical view displayed to a user device as generated by the online gaming platform, in accordance with described embodiments.

FIG. 3A depicts an exemplary graphical view displayed to a user device 301 as generated by the online gaming platform, in accordance with described embodiments.

For instance, there is depicted here, a users' computing device 301, such as a tablet, mobile phone, smart phone, PC, etc., upon which there is displayed the game board 300 having both the game map at element 310 and also the table view, rendered by elements 320 and 325. Element 320 depicts the participant player's "team name" as chosen by the player, in this case the participant player has chosen the team name "Optimap." Further depicted at element 320 is the presently empty and soon to be filled "Roster" as selected by that player participant. Rounds 1, 2, and 3 are depicted as empty rows within the scrollable table GUI at element 320.

Further depicted is sub-table 325 which displays to the player participant the various players available to that player for their draft pick. The table is sortable by clicking on the column headers, for instance, to sort the list of players by "best available" (e.g., sorting by player rank) or sorting by team, position, player name, etc. Clicking the "All" column header prompts the user with a filter dialog in which they can search for a particular player, search for players of a team, or filter/limit the displayed list to only a sub-set based on selectable criteria (e.g., team name, rank range, position, injuries, player statistics, etc.).

At the bottom of the game board 300, there is still further depicted a draft round indicator, providing a visual reference to the player participant as to which round of the draft they are presently participating. Currently the draft round indicator 315 is set at round 1 given that the draft has not yet started or has only just begun, with no picks or selections by any player.

Individual Player Version:

Further embodiments provide for game instances managed by the online gaming platform in which the draft is conducted on the basis of drafting individual professional, collegiate, or international sports athletes to form a customized player participant team, rather than selecting entire teams as is described in the preceding examples. However, the graphical interfaces, tables, and game map board depictions that are illustrated here are equally applicable to both "team" based drafting as they are to individual sports athlete based drafting. Similarly, previously described examples of interfaces, tables, game map boards, etc., described above with respect to the "team" based drafting mechanisms are likewise combinable and applicable to individual sports athlete based drafting mechanisms.

According to particular embodiments, the online gaming platform implements an online fantasy sports game which may be referred to as "March Mapness™" in which players draft teams from a map for a season or tournament, such as NCAA college basketball tournament commonly known as "March Madness."

In such a way, the online gaming platform combines the popularity of March Madness brackets with fantasy sports and board games with maps. The available game instances are not, however, limited strictly to NCAA college basketball tournaments. Rather, the game instances provided by the online gaming platform may also be played with other college sports tournaments and regular seasons, professional league sports such as NFL, NBA, MLB, NHL, MLS, Premier League, or Bundesliga, international sports tournaments such as the World Cups for soccer, cricket, or rugby, and the Summer and Winter Olympics. As noted above, the game instances provided by the online gaming platform may also be played on the basis as non-athletic sporting events including academic tournaments and e-sports tournaments.

Previously known gaming systems simply do not offer the ability to provide fantasy sports or tournament bracket games in conjunction with a system generated map for a game board, draft, or bracket. Similarly, there is no competing contest or website that provides the capability for picking teams based on geographical location, much less creating territorial regions from a collection of player-selected polygons or having geographic relationships determine allowable draft selections, as is described herein.

In embodiments for choosing exclusive regions of teams from a league of approximately 30 teams (e.g., NFL, NBA, MLB) or a tournament of approximately 64 teams (e.g., NCAA basketball), the online gaming platform fills a unique niche by catering to smaller groups of friends and family, such as small groups of 2-8 players, where each player drafts a "team of teams" consisting of ½ (half) to ⅛ (an eighth) of the number of teams. Whereas prior sports platforms for picking winners, such as bracket-prediction pools and NFL "pick'em" contests, in which each player predicts the outcome of each game, tend to cater to larger groups of people in the dozens or even hundreds of player participants.

For major-leagues sports, the contest can span both the regular season and playoffs, thus providing a fun and intuitive cross-link between the online gaming instances provided by the online gaming platform and real-world sporting events and tournaments.

Still further, the online gaming platform is not limited to gaming instances in which teams, cities, countries, or other predefined entities must be selected from the map. Rather, the online gaming platform further supports the ability to draft a "team of teams" for an entire season or tournament, a gaming variant and rule-set which is wholly unique to the marketplace.

For example, for fantasy sports, the player participants or contestants may draft a team of individual players from available teams, thus forming a player-customized team of players. In other team-based contests, player participants or contestants may predict all games (e.g., tournament brackets, weekly pick'em) or choose one team (e.g., elimination pools). Moreover, the online gaming platform provides a variety of educational benefits, such as aiding participants with learning geography while having fun.

Thus, for teams or contestants competing in a sports tournament or season, such as the college basketball tournament, the World Cup, the NFL, or the Olympics, a player participant may select individual sports athletes from those teams rather than selecting the teams themselves. As before, the teams are located geographically and a map is rendered by the mapping engine 195 of the online gaming platform 101, thus dividing the entire region (e.g., USA, world, etc.) into polygons, with one team per polygon. This rendered map then serves as the online game board. Similar to the preceding examples, player participants take turns choosing from teams with the stipulation that they can only choose from a polygon that is adjacent to the polygon of one of their previously selected athletes. As before, this default rule may be altered by the player participant acting as the commissioner.

Similar to the team based selection rules, the game instance rules for individual sports athlete/player rules utilizes the same geographical, polygon-based drafting system. However, as noted above, the player participant draft individual sports athletes/players into an athlete/player-based fantasy sports game. The draft is conducted similar to that which was described above, with the participant player following geographic-adjacency requirements, of which there are similar permissible variations as described above, and also additional variations.

Figure 3B:
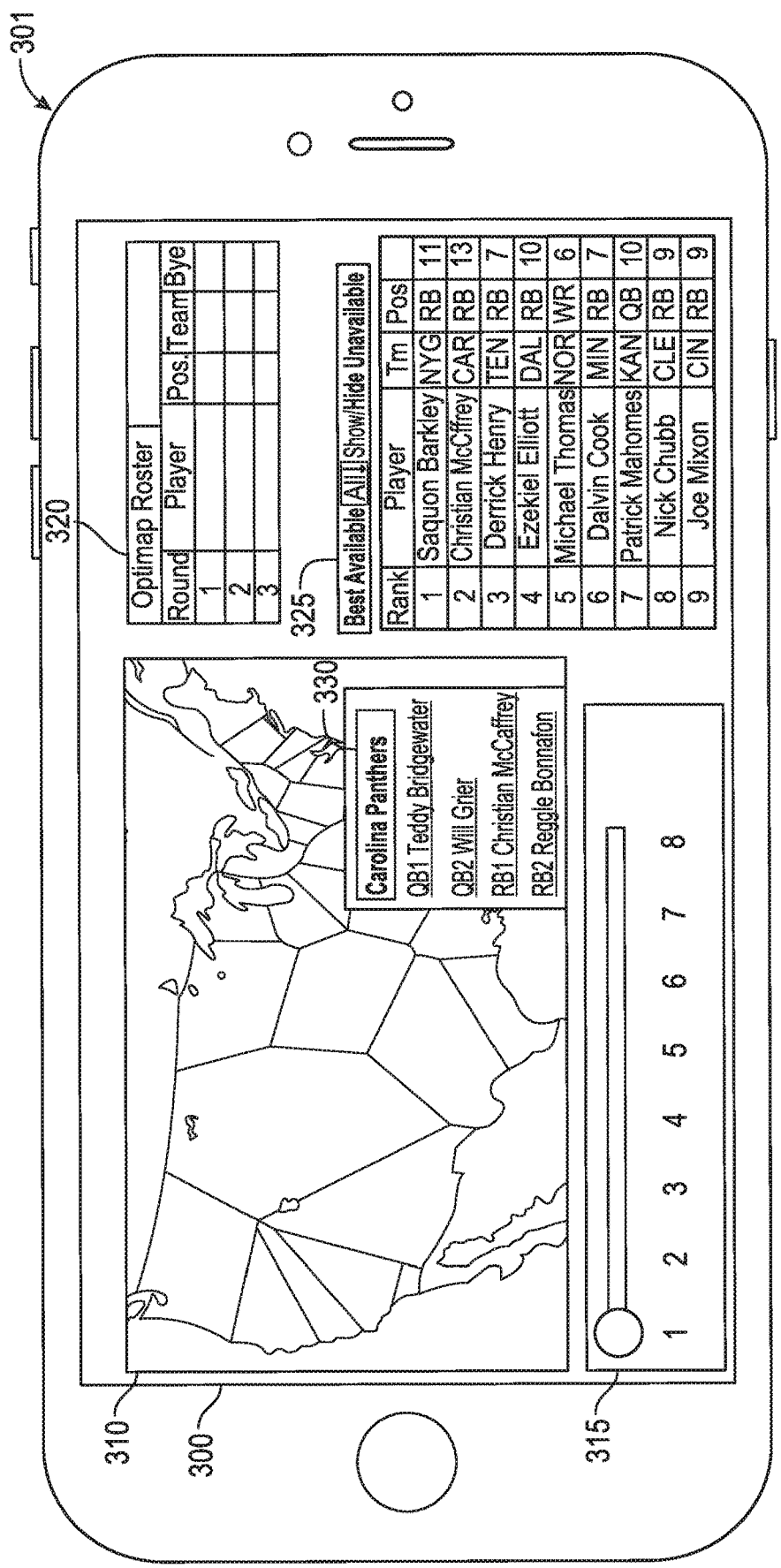
FIG. 3B depicts another graphical view displayed to a user device as generated by the online gaming platform, in accordance with described embodiments.

FIG. 3B depicts another graphical view displayed to a user device 301 as generated by the online gaming platform, in accordance with described embodiments.

As depicted here, element 330 presents a graphical overlay on top of the map from which the player participant may select a sports athlete associated with a particular polygon responsive to clicking on the polygon. For instance, as shown here, the polygon corresponding to the location for the Carolina Panthers has been selected and the overlay display box 330 thus presents the available sports athletes that are selectable this round. Alternatively the player participant may select one of the players from the sub-table at element 325, listing players from different teams.

Further depicted is the draft round indicator 315 which presently shows that the draft is still in round 1 and it is currently the turn of the player participant identified as "Optimap." No sports athletes have been selected yet, and thus, the roster displayed at element 320 remains empty.

Figure 3C:
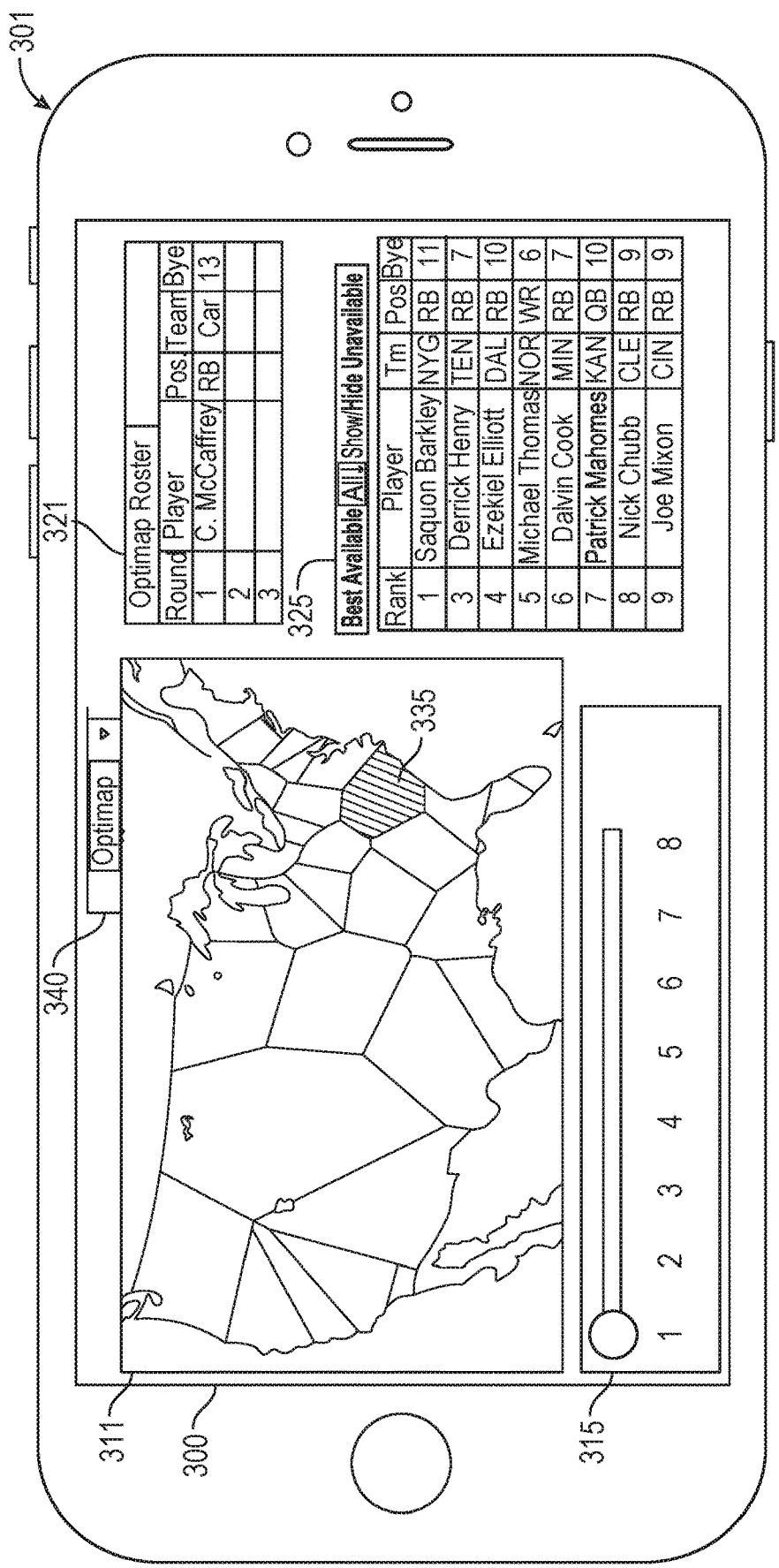
FIG. 3C depicts another graphical view displayed to a user device as generated by the online gaming platform, in accordance with described embodiments.

FIG. 3C depicts another graphical view displayed to a user device 301 as generated by the online gaming platform, in accordance with described embodiments.

While the draft round indicator 315 still shows round 1 is active, the player participant identified as "Optimap" has begun to fill the roster 321, in which it is now indicated that C. McCaffrey has been drafted or selected from the Carolina Panthers. Additionally, the polygon 335 corresponding to the Carolina Panthers has been activated, now depicted with a striped pattern. In actual gameplay, the online gaming platform would render the map with the Carolina Panthers polygon 335 rendered a specific color or representation which is associated with the player participant identified as "Optimap," such as green, yellow, blue, etc.

Figure 3D:
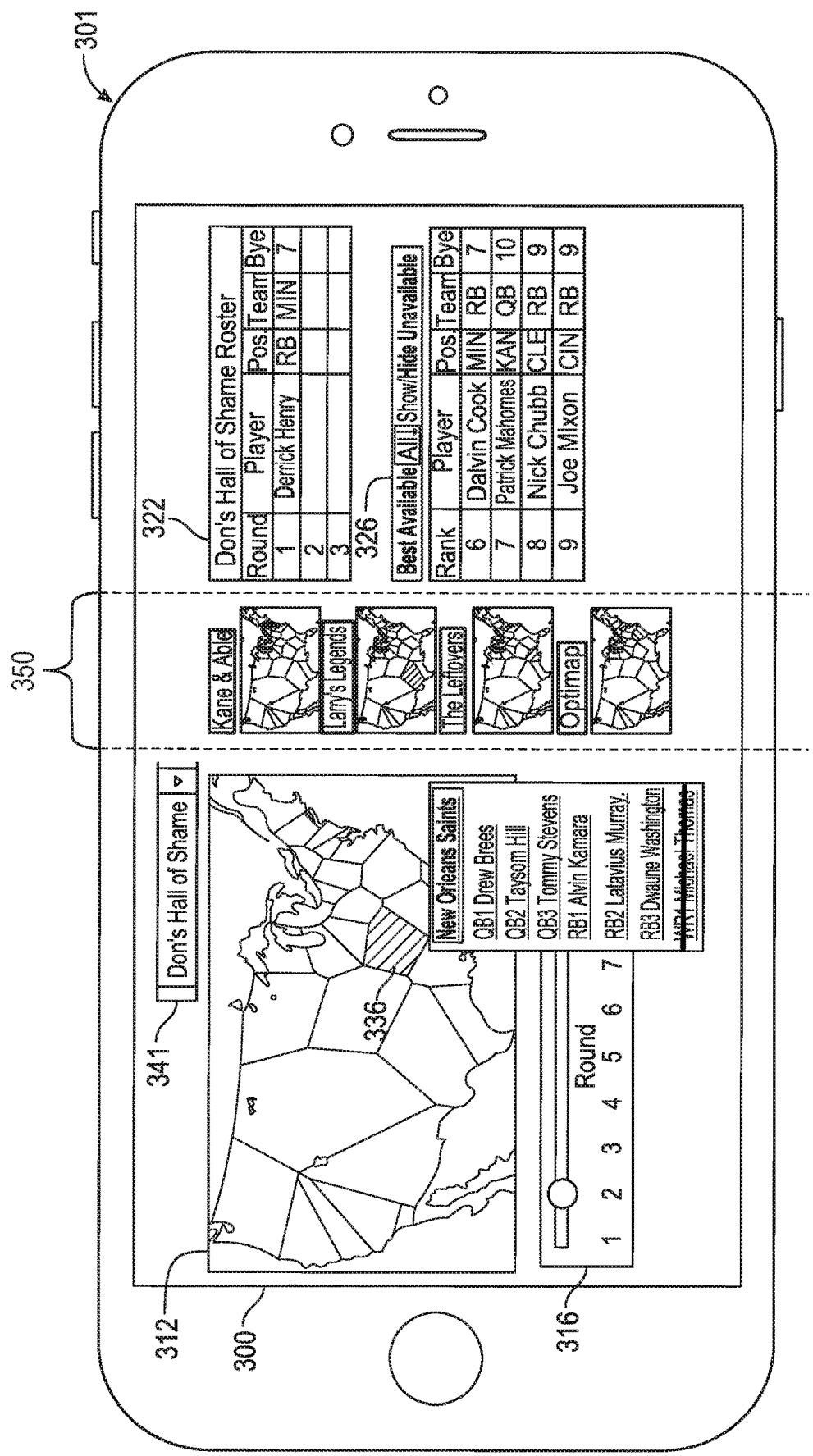
FIG. 3D depicts another graphical view displayed to a user device as generated by the online gaming platform, in accordance with described embodiments.

FIG. 3D depicts another graphical view displayed to a user device 301 as generated by the online gaming platform, in accordance with described embodiments.

As shown here, the draft round indicator 316 has advanced to round 2 and the player participant identified as "Don's Hall of Shame" at element 341 is now actively selecting their draft pick. As before, the player participant may select their sports athlete from the sub-table 326 listing the available athletes or may select a geographically associated polygon which will then trigger the online gaming engine to present the overlay box from which individual players may be selected for a specific team. As shown here, the New Orleans Saints have been selected by the player participant, and the available sports athletes/players from the New Orleans Saints are therefore displayed to the player participant.

Additionally depicted in this view is a miniaturized view of the opponents' maps at element 350, depicting the regions having been selected by each opponent player as well as the opponent player's "Team name." If the miniaturized maps 350 are selected, then a larger version or full size version will be presented to the user device, such that each player participant may view the current state of the game instance from the view point of any opponent player in the league.

After rosters are constructed following the unique geographic draft process, the individual player based gaming instance plays out in the same manner as a typical fantasy football or baseball league, as described below.

Each week, day, or round, owners of fantasy teams set their starting roster and accumulate points based on the statistical performance of their starters having been drafted into their customized teams, each starter corresponding to their drafted sports athlete. The same rules and procedures apply to trades, waiver adds and drops, starting rosters and bench players, and point systems, although geographical restrictions could also be applied to trades and acquisitions if desired by the player participant having the role of commissioner.

According to described embodiments, the term "player" may be used in reference to the player participant of the gaming instance when described in the context of the team based drafting process. Conversely, it should be made clear that the term "player" in the context of the individual sport athlete drafting process may refer to the professional athlete being drafted into the customized team of an "owner," with the "owner" thus being in reference to the end-user participating in the gaming instance. So as to avoid confusion, the term "sports athlete" is utilized to signify the individual professional, collegiate, or international sports athletes being drafted into such customized teams by the player participant "owner."

As before, by clicking on the New Orleans Saints polygon, the player participant can see which Saints players are available, in which the drop-down list shows that WR Michael Thomas has already been selected by the blue team and is therefore unavailable. For instance, the GUI may display WR Michael Thomas as being on the Saints team, but show the sports athlete/player's name as grayed out, crossed out, or otherwise non-selectable.

The Best Available list at sub-table 326 shows all available players in black font, whereas unavailable players may be grayed-out or simply hidden. "Available" players must be available according to two different meanings. First, an athlete is available if they have not been previously selected by another player participant. Second, an athlete is available if they play for a team in a polygon that is adjacent to one previously selected by the player participant currently drafting. Other variations of this rule are described below.

The list can show all positions or be filtered by position. The thumbnail maps 350 also show that the Blue team (e.g., Kane and Able) has selected a player from the New Orleans Saints polygon, which is useful strategic information if Orange team (e.g., Don's Hall of Shame) is trying to work its way West in order to enable a later sports athlete pick from either the Dallas Cowboys or the Houston Texans in the third round.

Figure 3E:
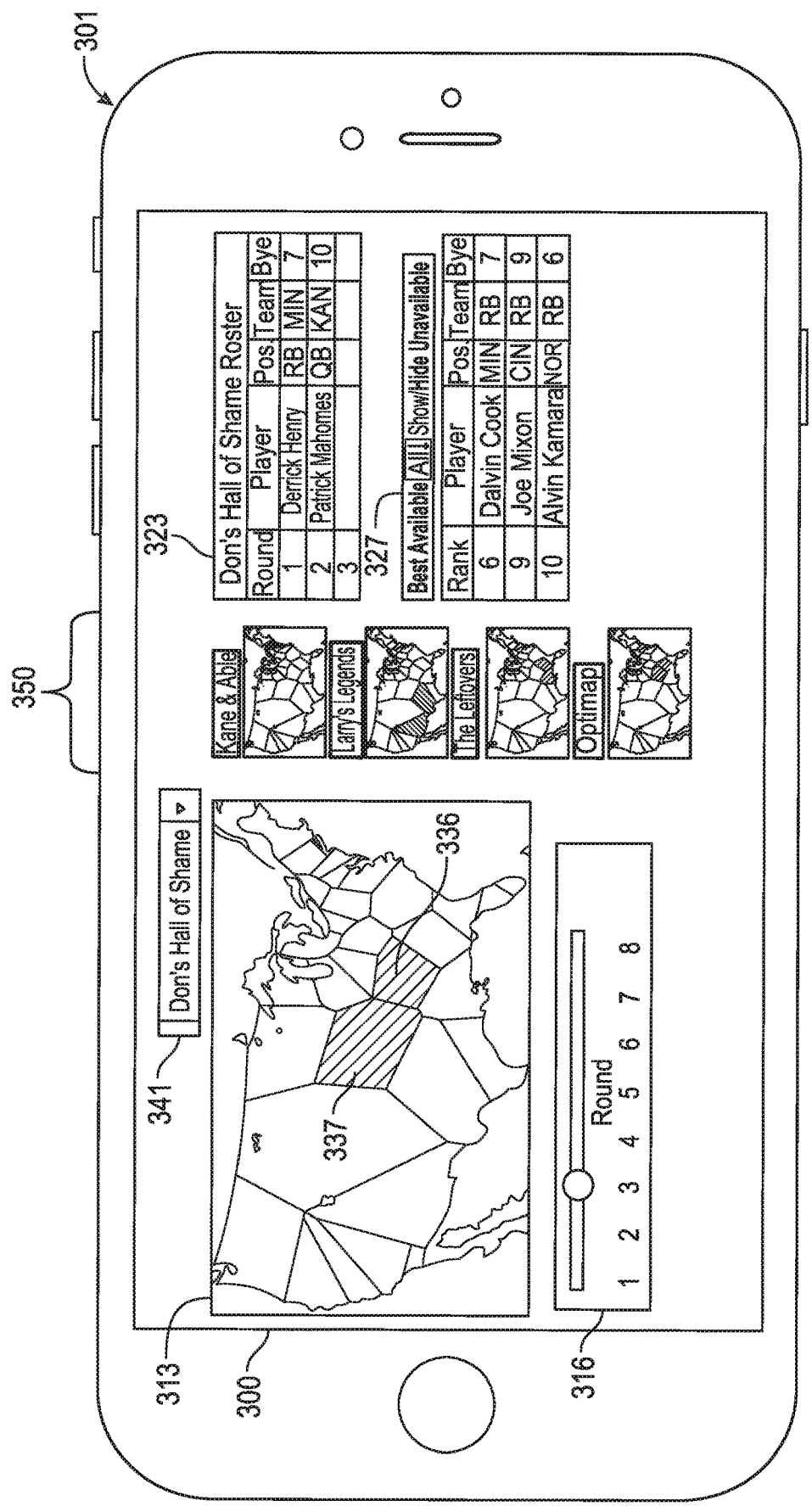
FIG. 3E depicts another graphical view displayed to a user device as generated by the online gaming platform, in accordance with described embodiments.

FIG. 3E depicts another graphical view displayed to a user device 301 as generated by the online gaming platform, in accordance with described embodiments.

There is again depicted the miniaturized maps of the opponent players at element 350 as well as the partially filled roster 323 and the available players 327.

After selecting a sports athlete, the GUI displayed to the user device changes to display the updated map and roster for that player participant, after which the next fantasy team player participant (e.g., fantasy team owner) is now on the clock. According to certain embodiments, a digital clock is further displayed at the GUI showing when a given player participant is "on the clock" meaning it is that player participant's turn, with the clock counting down to zero based on a pre-configured time-limit as set by the rules engine of the online gaming platform or as configured by the commissioner for the game instance.

In the second and subsequent rounds, player participants can only choose new sports athletes from a team whose polygon is adjacent to one previously selected by that same player participant, thus forming a contiguous territory of adjacent polygons. In this way, player participant owners gradually build up rosters of sports athletes/players from contiguous regions of neighboring teams. The online gaming platform and specifically the rules engine will not allow a player participant to choose a player from non-adjacent team when utilizing default rules.

With the default league settings, a player participant owner is allowed to select a sports athlete from a team from which another owner has already selected a player, so long as the new player is different and the polygons are adjacent. As with the above description with respect to drafting teams, each sports athlete may only be owned by one player participant owner at a time, notwithstanding the fact that multiple player participant owners may draft and "own" different sports athlete players from the same team. With alternative rule configurations, drafting of sports athlete players is restricted in such a way that a different player participant owner cannot draft from a polygon and team from which a different owner has already selected a sports athlete player. In yet another variation, a single player participant owner may select sports athlete players from the same team through iterative draft picking rounds (e.g., two or more players from the New Orleans Saints, or from some other team), however, a player that does this does not expand their geographical region and thus may disadvantage themselves in future draft pick rounds due to reduced adjacency options leading to other selectable polygons. As before, such rules are enforced by the rules engine of the online gaming platform once selected and configured by the commissioner.

Figure 3F:
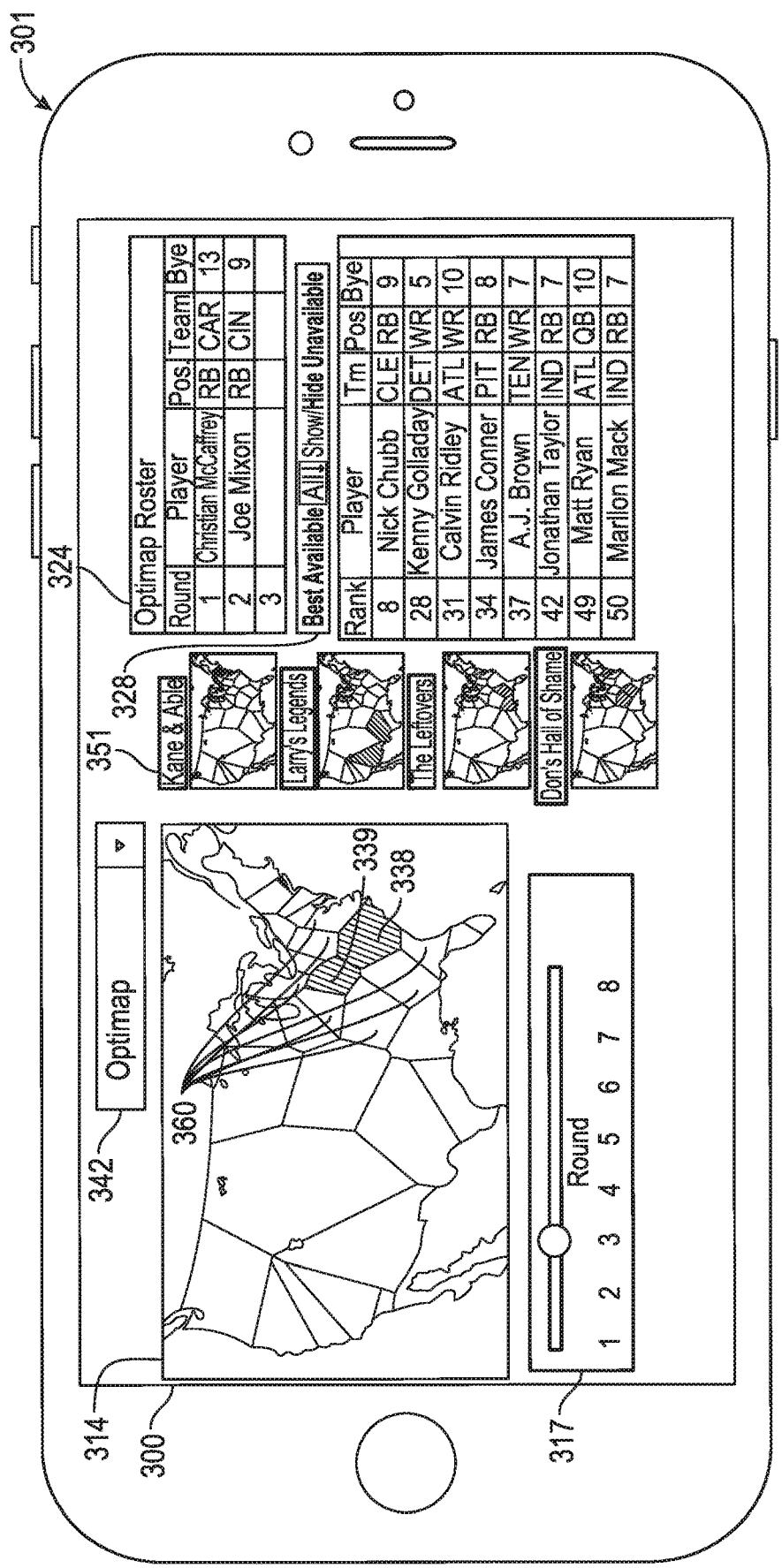
FIG. 3F depicts another graphical view displayed to a user device as generated by the online gaming platform, in accordance with described embodiments.

FIG. 3F depicts another graphical view displayed to a user device 301 as generated by the online gaming platform, in accordance with described embodiments.

As shown here, the draft round indicator 317 has advanced to the beginning of round 3 and it is again the turn of the player participant identified as "Optimap" 342.

Because this player participant previously selected contiguous polygons 338 and 339, they may now pick from any selectable polygon which is adjacent to either polygon 338 or 339, identified here as polygons 360.

Available polygons are shown in white here and in the exemplary GUI implementation and unavailable polygons would be grayed out or displayed in some manner that indicates they may not be selected by that player participant during that draft round.

In the third and subsequent rounds, the draft process can follow a number of different geographical assumptions, which create different possibilities and strategies. In the default settings, a player participant owner can choose any un-owned sports athlete/player from any team polygon adjacent to any of that player participant's previously selected polygons. They can also choose a second sports athlete/player from one of the teams from which they have already selected, though this comes at the cost of not expanding their territory, which in turn will limit their future options.

While certain draft mechanics have been described, other variations can be played by varying some simple league settings. For instance, the league commissioner could set it up so that one's third pick must be from a team adjacent to one's second pick; and thus, pursuant to such rules, one can no longer select from polygons that are adjacent to one's even-earlier picks (unless they are also adjacent to one's last pick). Another setting can allow or disallow owners from picking multiple players from the same team. Stated differently, game rules variations may limit a players selection to only those polygons that are adjacent to that player's preceding selection (e.g., the player's selection from one round prior and not selections by the player having occurred two or more rounds prior). Yet another variation is to limit the player's selection to a polygon adjacent to the player's immediately preceding selection without regard to whether or not the adjacent polygon has been selected by another player. In such an embodiment where the multiple player participants may select a sports athlete player from an already selected team's polygon, then it would be permissible for the player participant identified as Optimap at FIG. 3F to also select a sports athlete player from any of the polygons identified by element 360, even if one or more of those polygons were previously selected by an opponent player. Again, this is permissible under certain rules conditions because the opponent player selected a sports athlete player from the team and not the entire team. Thus, all other sports athlete players from the previously selected team remain available to all other players, so long as they meet the adjacency requirements specified by the commissioner in the league settings Still further, territory exclusivity may be incorporated into gameplay rules, thus making any prior selected polygon by any player unselectable, regardless of adjacency.

Exclusive Territories:

Another league setting is whether team polygons are locked to, and made to be exclusive to a single fantasy team owner (e.g., a single player participant). The Exclusive Territories setting means that only one player participant owner can select a sports athlete/player from a given team polygon. For most sports leagues such as the NFL, NBA, MLB, and NHL, the "Exclusive Territories" setting should be paired with the "Allow Multiple Players" from the Same Team setting, or else it would become impossible to fill out a complete roster. Of course, this depends on the number of fantasy teams, the number of real team polygons, and the roster size. In a 5-team NFL fantasy league with Exclusive Territories, each fantasy player participant owner might end up with an Exclusive Territory consisting of roughly six NFL teams each, given that there are only 32 NFL teams.

Figure 4A:
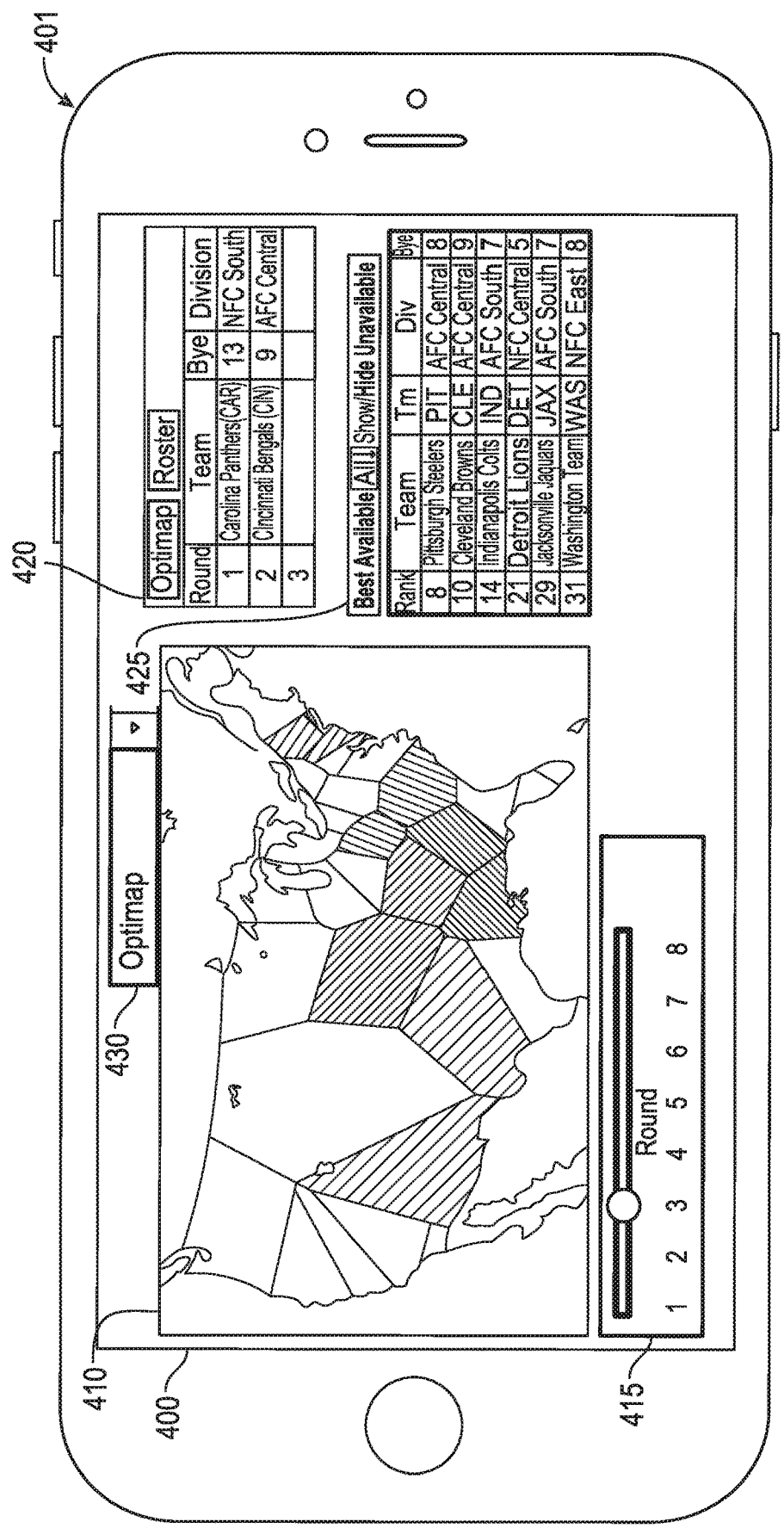
FIG. 4A depicts another graphical view displayed to a user device as generated by the online gaming platform, in accordance with described embodiments.

FIG. 4A depicts another graphical view displayed to a user device 401 as generated by the online gaming platform, in accordance with described embodiments.

As shown here, there is again a game board 400 having a game map 410 rendered thereupon. The draft round indicator 415 shows the current draft round is set to 3 and the player participant identified as "Optimap" 430 is on the clock. The roster 420 for Optimap is partially filled by team polygons they selected in the first 2 rounds, and the Best Available list 425 shows various adjacent NFL teams polygons available for drafting.

Creating and Joining a League:

Similar to the process above for team drafting, creating and joining a league is supplemented with certain addition settings for the commissioner to configure when instantiating a new game instance for individual sports athlete/player drafting. Many of these settings are similar to the above described team based fantasy leagues, such as number of teams, draft date, point systems, playoffs, roster sizes, waiver and trade rules, etc.

For the map-based individual sports athlete/player drafting process, this version requires more commissioner settings than the team-based version. Certain notable settings configurable in accordance with exemplary embodiments include the following: Adjacency—owners may draft players on teams: (i) adjacent to any team polygons of players on your roster (default) or (ii) adjacent only to the team polygon of your last player selected. Multiple players from the same team allowed on a roster—(i) Yes (default) or (ii) No. Exclusive territories—(i) No—multiple player participant owners can own sports athletes/players on the same NFL team (default) or (ii) Yes—if you are the first to choose a KC sports athlete/player, no one else can choose a KC player, or (iii) player participants may go through the KC polygon to get somewhere else.

With exclusive territories, player participant owners will end up owning a few teams exclusively in a group of contiguous polygons, and must then draft the rest of their rosters from those teams only.

Boxed-in—What happens when an owner is boxed-in (trapped)—(i) Their territory at that time is final, and they cannot choose any more polygons or (ii) they lose a turn, and can then choose any non-adjacent polygon.

Polygons per fantasy team—(i) equal number for each fantasy team or (ii) maximum number for each fantasy team or (iii) no maximum—each fantasy team can continue choosing additional polygons as long as they adhere to the adjacency requirements and do not exceed the roster size.

The Draft—The default settings, similar to those in the March Madness bracket version, in which in the first round, player participants choose their first pick, which is an individual sports athlete/player on any team. That team's polygon serves as their anchor point or initial seed region. The player participant can click on a polygon to see that team's roster and choose a sports athlete/player from that roster, or they can choose a sports athlete/player from the Best Available list, depicted here on the right side of the screen.

As shown here, at draft round 3, the player participants have formed separate geographical regions from their selected contiguous polygons.

Figure 4B:
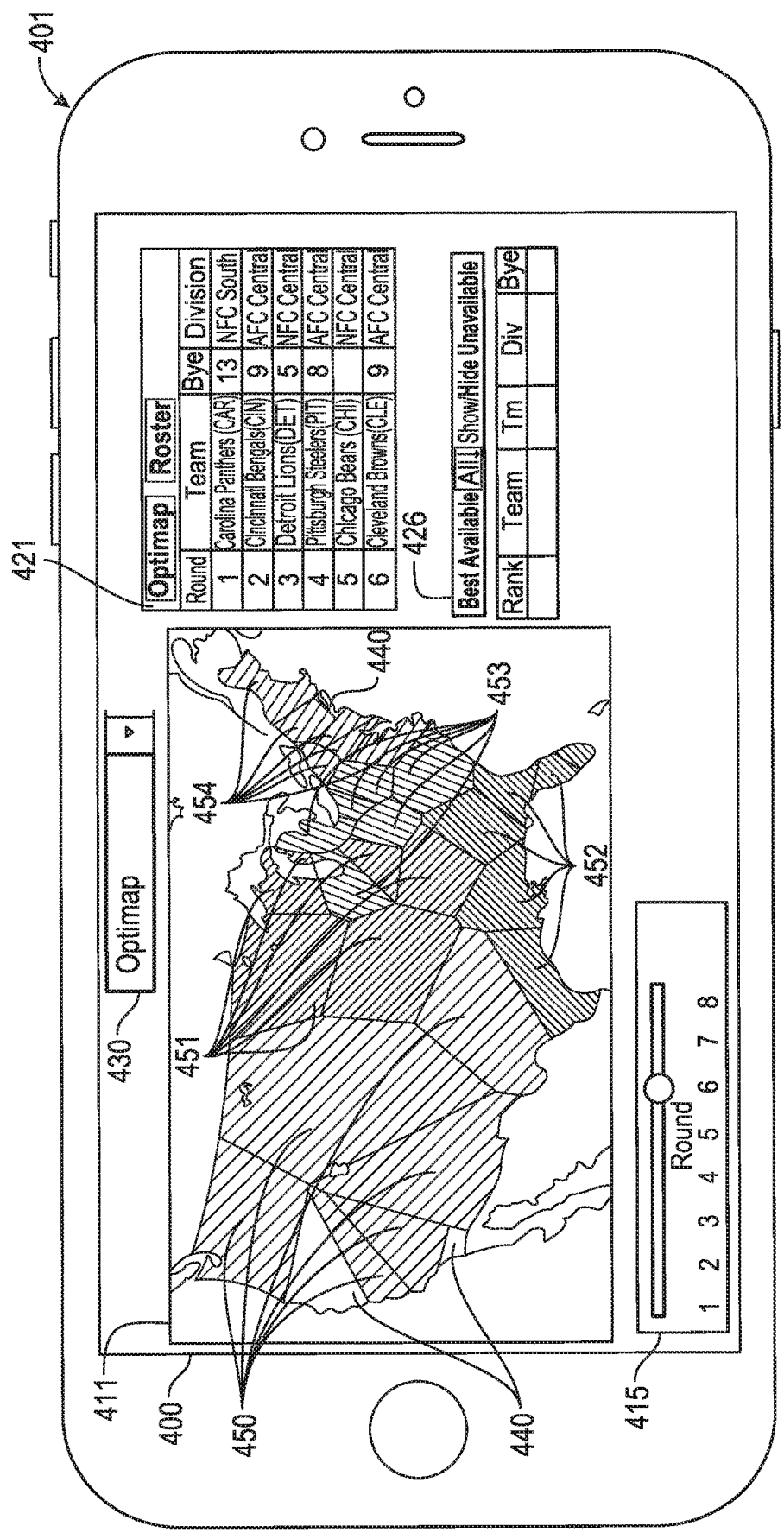
FIG. 4B depicts another graphical view displayed to a user device as generated by the online gaming platform, in accordance with described embodiments.

FIG. 4B depicts another graphical view displayed to a user device 401 as generated by the online gaming platform, in accordance with described embodiments.

Notably, it is now depicted that the game map is nearly fully selected at draft round 6. One team has contiguous polygons 454, another team has contiguous polygons 452, another team has contiguous polygons 453, and yet another team has contiguous polygons 450. Note that polygons 440 on both the east and west coasts remain un-selected and thus available to certain player participants.

With Exclusive Territories, it is simplest to conduct the draft by selecting whole teams rather than players on teams. This is because, once a player participant owner has selected a sports athlete/player from a team, they essentially own that team and they have the exclusive right to choose other sports athlete/players from their teams.

However, it is also possible to conduct the Exclusive Territories draft by selecting individual sports athlete/players from exclusively owned teams. In this case, one would end up with a roster of starting and bench players from one's exclusive teams, and that player participant would have to expend a waiver transaction to swap one of their teams' sports athlete/players for another of their teams' sports athlete/players.

Trades and Waiver Transactions:

Once the draft is concluded, fantasy team owners can trade sports athlete/players or they may add players or drop players, or conduct some combination of trades/adds/drops. This process may be done without geographical restrictions, or the league settings may require geographical adjacency for trades and pickups to be legal. Player drops and trades could also be disallowed if they would create a geographic break in connectivity and lead to a non-contiguous territory. In this case, if one were dropping or trading a player that would create a break in contiguity in one's existing territory, one would have to pick up a player to restore that geographic contiguity.

The trade and waiver restrictions could also include the only-one-player-from-any-team rule and the exclusive territories rule.

Auction Draft:

The geographical draft may also be conducted as an auction instead of a snake draft. A draft order is set up for nominating players. Once nominated, player participant owners with sports athlete/players adjacent to the nominated player's polygon may bid on the sports athlete/player. The highest bid wins the sports athlete/player and they are added to that player participant owner team's map and roster. Similarly, in the exclusive territories game variation, an auction could be conducted for an entire NFL team's roster of individual players in this fashion. If on a player's turn they try to select or nominate a certain available polygon adjacent to one of their previously selected polygons, other player participants with polygons adjacent to the nominated polygon could attempt to outbid them for the right to claim the nominated polygon.

Accumulating Points and Winning the Contest:

Once the season is underway, the league game instance functions similarly that described above with regard to the team based drafting gaming instances.

Unlike previously known fantasy leagues, however, the gaming instance described herein: enforces geographical trade and waiver transaction requirements (see above), and in which the map displays of ongoing seasonal results, such as shading or 3-D visualization of cumulative points won from each polygon. This could be displayed for all fantasy teams combined, but would be most applicable for game instances having the Exclusive Territories game setting active.

Figure 4C:
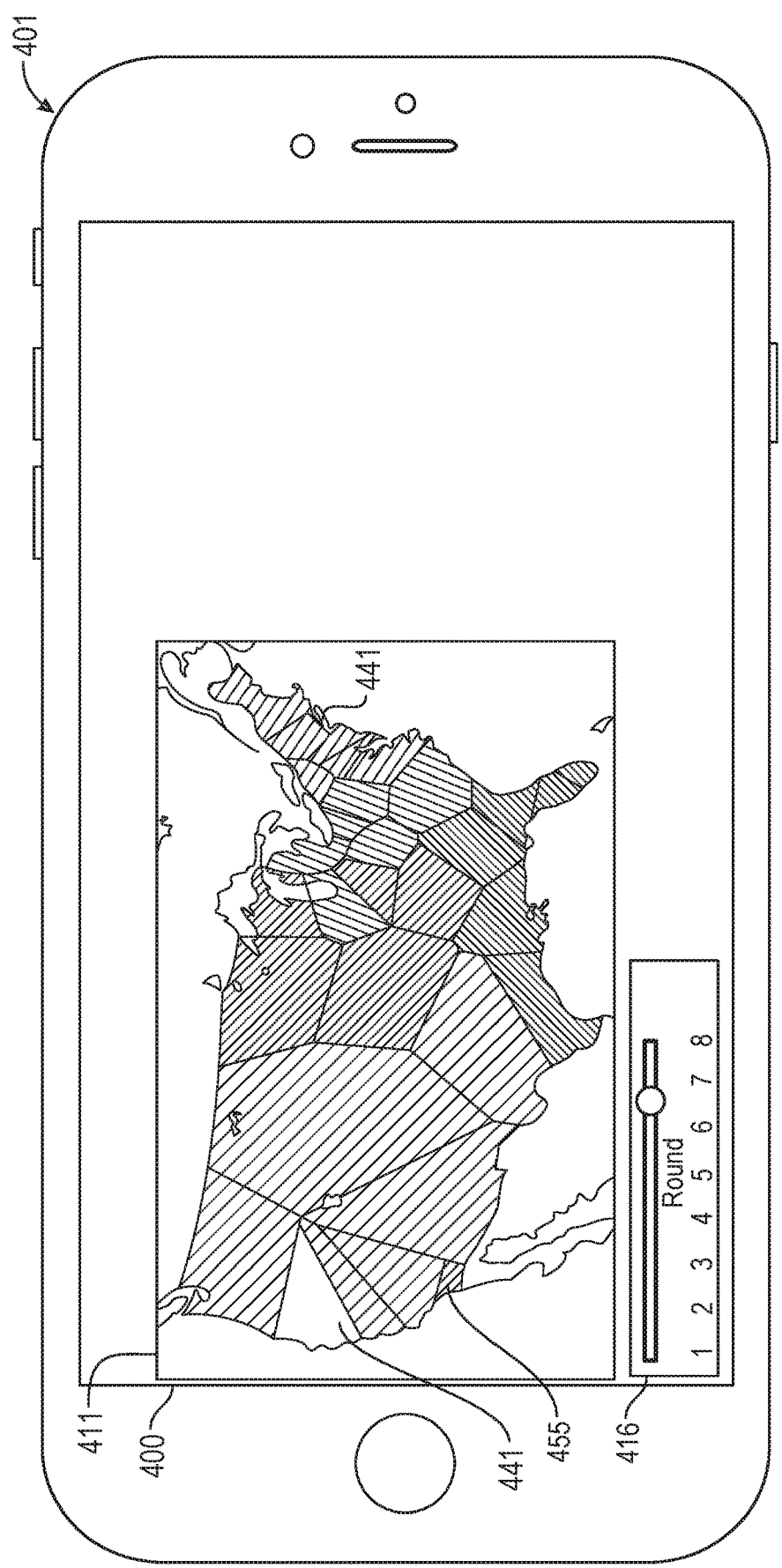
FIG. 4C depicts another graphical view displayed to a user device as generated by the online gaming platform, in accordance with described embodiments.

FIG. 4C depicts another graphical view displayed to a user device 401 as generated by the online gaming platform, in accordance with described embodiments.

As depicted here, the previously unselected polygons (identified as element 440 at FIG. 4B) have now been selected by the player participants pursuant to the draft. Note however, that polygon 455 has been selected as part of a non-contiguous region as a result of one of the players becoming trapped or boxed-in and thus being permitted according to configurable rules to select a non-contiguous polygon. This is more likely to occur toward later draft rounds when movement is restricted or blocked by opposing players. In such a way, a boxed-in participant player may nevertheless continue to select polygons and then attain an equal number of selected polygons as are selected by the other player participants in that game instance.

Figure 4D:
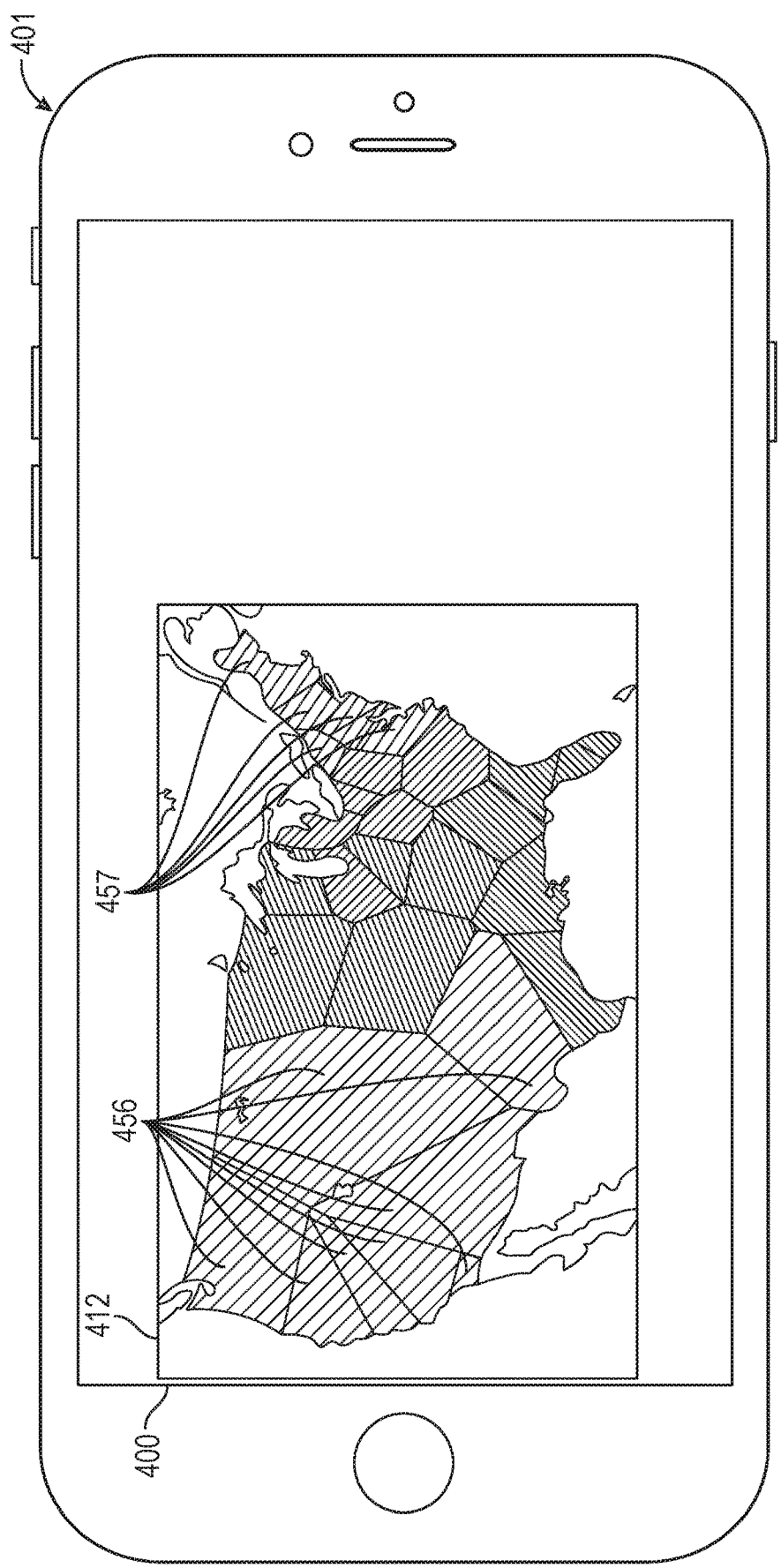
FIG. 4D depicts another graphical view displayed to a user device as generated by the online gaming platform, in accordance with described embodiments.

FIG. 4D depicts another graphical view displayed to a user device 401 as generated by the online gaming platform, in accordance with described embodiments.

Unlike the prior example where a player is permitted to select a non-contiguous region, here the game map has been fully selected, but upon careful observation, it may be seen that certain players have more polygons selected than others. This is because as players became boxed-in or trapped, the rules engine was configured to not allow the trapped player to select non-contiguous regions. Therefore, the player associated with polygons 456 possesses 7 polygons, whereas the player associated with the mid-west region under the Great Lakes possesses only 6 polygons and the player having southern region with all of Florida, Georgia, part of Texas, and then the portion moving into the Northeast possesses 9 polygons, thus giving that player a significant advantage.

Still other variations are possible. For example, the online gaming platform may facilitate a weekly NFL pick'em contest using exclusive territories, with player participants picking teams to win their game that week outright or beat the spread.

Generally speaking, embodiments described herein enable a sports-entertainment interactive website with educational properties through the use and implementation of the online gaming platform and the described GUI interfaces. The invention can be applied to many different sports at any level from national teams to professional leagues to colleges, and from international to local scale. Described embodiments allows fans, friends, and family members to compete with each other in picking sports results using a map and combines elements of fantasy sports, map-based board games, and tournament pick-em contests.

Previously known fantasy sports platforms were limited to picking teams based on predicted statistical performance or personal preference without regard to geographic location. Conversely, described embodiments enforce a sequential draft process in which player participants are required, as enforced by the rules engine, to either draft individual sports athletes/players or to draft sports teams based on geographic constraints. Through use and practice of the described embodiments, players are challenged to think strategically about the picks they will make based on geographic locations and relationships. No other existing fantasy sports, sports betting, or pick'em competition website involves selecting teams using strictly geographic relationships nor does any previously known solution require the same type of geographic strategic thinking as is mandated by the unique rules of gameplay described herein, upon which players are encouraged to conquer regional territories through the sequential picking/drafting of teams or sports athletes in a gaming instances related to competitive sports, tournaments, etc.

Participants compete by choosing a set of teams or individual players consisting of a set of connected regions (polygons) on a map. The winner is the participant whose geographically adjacent team of individual players, or geographically adjacent set of teams, accumulates the most points (based on individual statistics or team wins) during the day, week, season, playoffs, and/or tournament, with both the drafting process and the live reporting of results being displayed on an interactive GUI and game map.

Such a geographical aspect of the game adds another layer of strategy and fun to fantasy sports and tournament bracket or regular season pick'em contests and pools. In a competitive landscape competing for the attention of fans, the geographical drafting process sets the embodiments described herein apart from that which is available to the marketplace today.

Furthermore, educational benefits stem from learning geography while having fun. Without realizing it, participants will learn where cities, states and countries are located when drafting their teams. When selecting Colorado State University or University of Buffalo for an NCAA tournament league, one learns where Fort Collins, Colo. and Buffalo, N.Y. are located. Likewise, in an Olympics league, participants can learn where countries are located, such as Sweden, Colombia, or Ethiopia.

The unique map-based interface and gameplay also scales and translates to many different sports, regions, geographical scales, and types of competition. The only requirement is that the teams (or even individual competitive contestants such as sports athletes) are inherently polygons, such as countries, or can be located as points, which are used to generate representative polygons on a map. In fact, this kind of interactive activity is not restricted to sports. As described above, a business class could compete on predicting the performance of currencies or stock markets or economic growth. A social studies or geography class could compete on predicting news coverage, natural disasters, or election results, or knowing facts about each state or country.

Figure 5A:
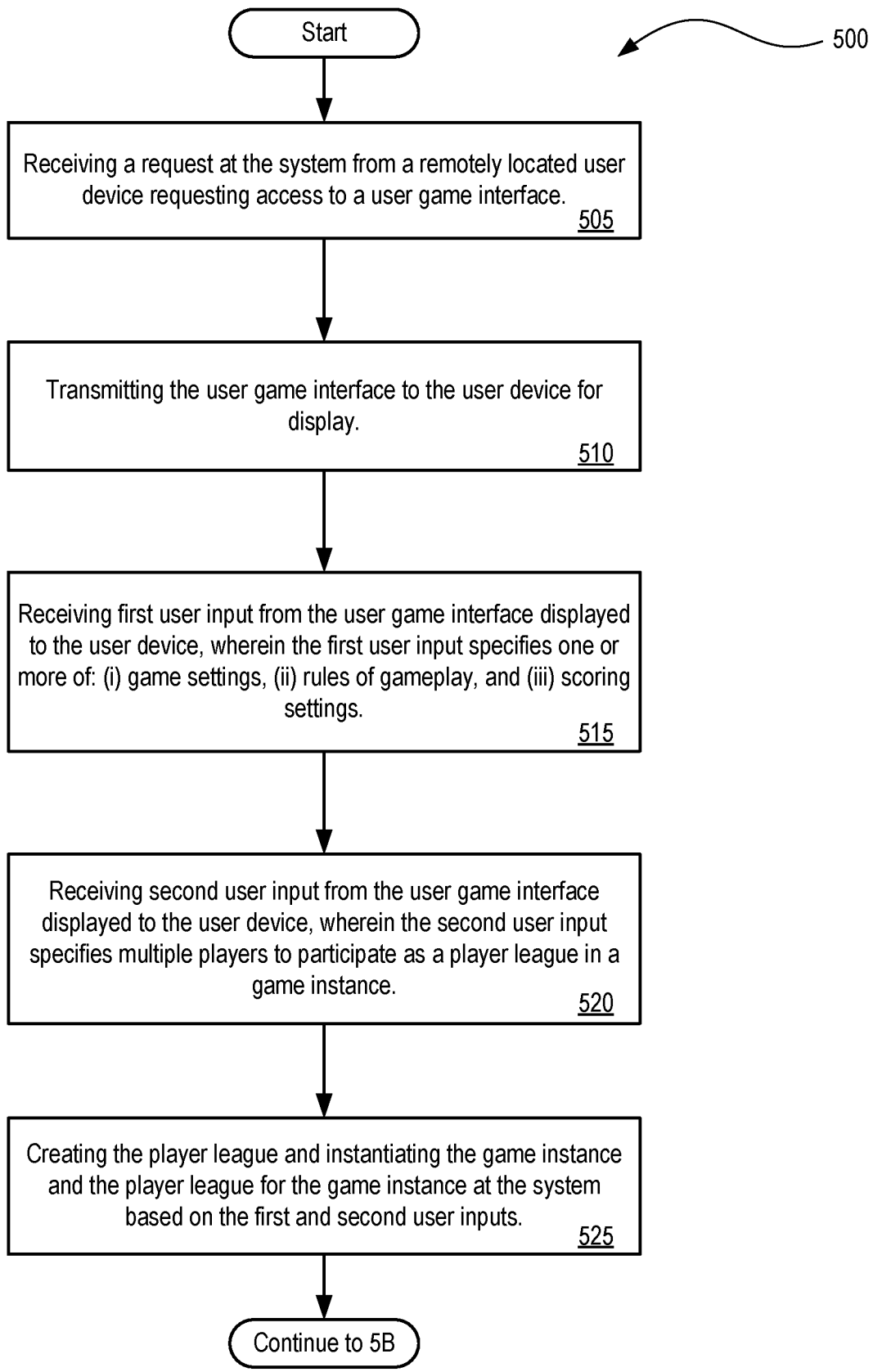

FIGS. 5A and 5B depict flow diagrams illustrating a method 500 and 501 for implementing an online map-based sports fantasy game competition, in accordance with disclosed embodiments. Method 500 and 501 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the machine 601 (see FIG. 6) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 500 depicted at FIG. 5A beginning at block 505, processing logic receives a request at the system from a remotely located user device requesting access to a user game interface.

At block 510, processing logic transmits the user game interface to the user device for display.

At block 515, processing logic first user input from the user game interface displayed to the user device, wherein the first user input specifies one or more of: (i) game settings, (ii) rules of gameplay, and (iii) scoring settings.

At block 520, processing logic second user input from the user game interface displayed to the user device, wherein the second user input specifies multiple players to participate as a player league in a game instance.

At block 525, processing logic creates the player league and instantiating the game instance and the player league for the game instance at the system based on the first and second user inputs.

Transitioning to the continuation of method 500, processing advances to FIG. 5B, where method 501 and specifically block 530 includes processing logic which sets a date and time for a league draft for the game instance.

At block 535, processing logic executes the league draft at the system by following a draft order for the multiple players of the player league, with each of the multiple players of the player league individually taking turns selecting an unclaimed polygon from a geographic map board during a first round of gameplay to establish a home territory for each of the multiple players of the player league.

At block 540, processing logic executes accumulates points based on the rules of gameplay and scoring settings specified.

At block 545, processing logic determines one of the multiple players within the player league as a winner based on which player has accumulated a highest point total after all rounds of gameplay and terminating the game instance.

According to another embodiment of method 500-501, the unclaimed polygon from the geographic map selected by each of the multiple players as the home territory for the respective player of the player league corresponds to a sports team; in which the method further includes: transmitting, from the system, a list of sports athletes affiliated with the sports team corresponding to the respective player's home territory for display to the user game interface displayed to the user device for the respective player; and continuing execution of the league draft at the system, in which each of the multiple players selects one of the sports athletes affiliated with the sports team corresponding to the respective player's home territory during the respective player's turn of the executing league draft at the system.

According to another embodiment of method 500-501, each of the multiple players selecting one of the sports athletes affiliated with the sports team corresponding to the respective player's home territory during includes: the respective player clicking on a graphical overlay displaying the list of sports athletes affiliated with the sports team corresponding to the respective player's home territory at the user game interface displayed to the user device for the respective player; and receiving, at the system, user selection input specifying which one of the sports athletes was selected by the respective player; and drafting the sports athlete selected by the respective player into a customized team for the respective player.

According to another embodiment of method 500-501, the respective player of each customized team includes a "team owner" for the customized team; and in which each "team owner" drafts multiple sports athletes into the customized team from one or more sports teams corresponding to either the polygon established as the respective player's home territory or from a sports team affiliated with a different polygon selected by the respective player during the league draft execution.

According to another embodiment of method 500-501, the game rules define polygons as either exclusive territories for each respective player in which only the respective player may draft sports athletes from a polygon selected by that respective player or alternatively as non-exclusive territories for each respective player in which any of the multiple players of the player league may draft sports athletes from a polygon selected by the respective player regardless of whether any other player of the player league has also selected the polygon.

According to another embodiment of method 500-501, the game rules define polygons as exclusive territories for each respective player; in which the method further includes one or more of: adding a player-specified logo to each exclusive territory selected by a player and displaying the player-specified logo at the gaming interface to all player participants for the game instance; adding a player-specified flag to each exclusive territory selected by a player and displaying the player-specified flag at the gaming interface to all player participants for the game instance; adding a player-specified branding image to each exclusive territory selected by a player and displaying the player-specified branding image at the gaming interface to all player participants for the game instance; and adding a player-specified helmet image to any sports athlete drafted from an exclusive territory selected by a player and displaying the player-specified helmet image at the gaming interface to all player participants for the game instance.

According to another embodiment, method 500-501 further includes: concluding execution of the league draft when all polygons on the geographic map board have been claimed.

According to another embodiment, method 500-501 further includes: automatically instantiating new gaming instances for a previously defined player league to conduct weekly pick'em games on a daily, monthly, or seasonal basis, pursuant to game configuration settings and preferences established by the player league's "commissioner."

According to another embodiment, method 500-501 further includes: concluding execution of the league draft when none of the multiple players of the player league have any remaining polygon that is contiguously adjacent to either the polygon established as the respective player's home territory or contiguously adjacent to another polygon previously selected by the respective player.

According to another embodiment, method 500-501 further includes: iteratively repeating execution of the league draft through a plurality of draft rounds; in which each draft round, each of the multiple players of the player league selects one additional polygon from the geographic map board which meets the following criteria: (i) the one additional polygon is adjacent to either the polygon established as the respective player's home territory or contiguously connected to another polygon previously selected by the respective player; and (ii) the one additional polygon remains unselected by any of the multiple players of the player league.

According to another embodiment of method 500-501, the system implements a online gaming platform; in which the online gaming platform executes via the processor and the memory of the system providing on-demand cloud based services to a plurality of player participant subscribers; and in which each of the player participant subscribers communicate with the online gaming platform system via a computing device which is remote from the online gaming platform and communicably interfaced with the online gaming platform via a public Internet.

According to another embodiment, method 500-501 further includes: persistently storing the player league having the multiple players defined therein as a digital asset within the system; and receiving new user input from one of the multiple players of the player league having the role of a "commissioner" for the player league, in which the new input specifies one or more of: an addition of a new player into the player league defined previously; a deletion of a new player into the player league defined previously; a reassignment of the "commissioner" role to a different one of the players of the player league as defined previously; and updating the digital asset within which the player league is persistently stored at the system based on the new user input received.

According to another embodiment, method 500-501 further includes: receiving new user input requesting the system to instantiate a new game instance using the player league as defined previously; receiving updates to one or more of the previously defined (i) game settings, (ii) rules of gameplay, (iii) scoring settings, or (iv) the player participants of the player league; and instantiating the new game instance at the system for the player league utilizing the received updates for the new game instance.

According to another embodiment of method 500-501, executing the league draft at the system by following the draft order further includes: each of the player leagues individually taking turns following the draft order selecting additional unclaimed polygons from the geographic map board expanding each respective player's league territory via subsequent rounds of gameplay.

According to another embodiment of method 500-501, selecting additional unclaimed polygons from the geographic map board expanding each respective player's league territory includes: each of the player leagues individually taking turns following the draft order selecting additional unclaimed polygons from the geographic map which are both (i) unclaimed polygons by any other player's league and (ii) immediately adjacent to the respective player league's previously selected home territory; in which selecting additional unclaimed polygons from the geographic map board expands each respective player's league territory via one or more subsequent rounds of gameplay after selection of the respective player league's previously selected home territory.

According to another embodiment of method 500-501, selecting additional unclaimed polygons from the geographic map board expanding each respective player's league territory includes: each of the player leagues individually taking turns following the draft order selecting additional unclaimed polygons from the geographic map as expansion territories which are both (i) unclaimed polygons by any other player's league and (ii) immediately adjacent and contiguous with the respective player league's previously selected home territory or immediately adjacent and contiguous with at least one of the respective player league's previously selected expansion territories from a prior round of gameplay; and in which the system prohibits a player league from selecting a non-adjacent or non-contiguous polygon from the geographic map board.

According to another embodiment of method 500-501, receiving the first player input further includes receiving date and time information for a league draft from the user device; and in which setting the date and time for the league draft includes scheduling the league draft for the game instance pursuant to the first player input specifying the date and time information.

According to another embodiment, method 500-501 further includes: transmitting the user game interface to the user device for display and further transmitting the user game interface to a plurality of additional user devices for display, the plurality of additional user devices corresponding to the player leagues created for the game instance pursuant to the second user input specifying the player leagues; and in which executing the league draft at the system by following the draft order for the player leagues includes prompting each of the user devices and the plurality of additional user devices for user selection input according to player turns as defined by the draft order and enforced by the game instance created at the system.

According to another embodiment of method 500-501, each of the unclaimed polygons from the geographic map board represent competition teams, season teams, or competing contestants of a sports tournament virtualized within the game instance by the system.

According to another embodiment of method 500-501, creating the player leagues includes: assigning a first player participant the role of a commissioner; receiving at the system, contact information from the commissioner via the user game interface specifying one or more desired league members; transmitting, from the system, invitations to join the game instance to the desired league members; and receiving acceptance of the invitations to join the game instance from the desired league members and responsively creating profiles for each of the desired league members.

According to another embodiment of method 500-501, creating the player leagues includes: joining one or more additional player participants randomly to the game instance and responsively creating profiles for each of the one or more additional player participants having randomly joined the game instance.

According to another embodiment of method 500-501, the player leagues for each game instance are selected from the group including: desired league members specified by a player participant having the role of commissioner whom are invited to join the game instance by the system; randomly joining league members joining the game instance based on time and day search parameters for the league draft day and time; and randomly joining league members joining the game instance to populate a minimum number of player league positions to be occupied for the game instance before commencement of any round of gameplay.

According to another embodiment, method 500-501 further includes: transmitting to the user device alternative views of the game instance for display at the user device responsive to receiving a click event on one of the geographic map board polygons at the user game interface; in which the alternative view includes one or more of tables, statistics, player participant information, and game points for the game instance.

According to another embodiment of method 500-501, the geographic map board embodies one of: a geographic region divided into polygons based on shortest Euclidean distance to a team location (Thiessen polygons), each configured around a point signifying a team location; a geographic region divided into polygons based on shortest driving distance to a team location, each configured around a point signifying a team location; a plurality of polygons defining pre-established geographic regions corresponding to any of states, provinces, districts, and countries; graphically represented changes in gameplay via altering of color or shading of the plurality of polygons of the geographic map board as the polygons are claimed by player leagues; and graphically represented changes in gameplay via updated statistics representing a current state of the game instance.

According to another embodiment of method 500-501, the game settings specify one or more of: a boxed-in condition for any player league resulting in the boxed-in player restricted from selecting any additional polygons throughout any subsequent round of the league draft regardless of having one or more unused league draft turns available when no unclaimed polygons adjacent to the boxed-in player league's claimed territories are available for selection; a boxed-in condition for any player league resulting in the boxed-in player permissibly selecting a non-contiguous and unclaimed polygon; and a boxed-in condition for any player league resulting in the boxed-in player losing at least one turn for selection of unclaimed polygons and subsequently permissibly selecting a non-contiguous and unclaimed polygon during a subsequent round of gameplay.

According to another embodiment of method 500-501, the game scoring settings specify one or more team draft settings from the group including: points awarded for lower seeds, points awarded for defeating higher seeds, points awarded for reaching a specified round of gameplay, points awarded for playoff victories, points awarded for earning a home territory playoff advantage, and points awarded pursuant to a winner-take-all competition format; and in which the game scoring settings specify one or more individual sports athlete draft settings from the group including: points awarded for sports athlete points scored, yards gained, touchdowns, catches, extra points, 2-point conversions, field goals, three pointers, rebounds, assists, steals, blocks interceptions, fumbles, sacks, RBI, home runs, wins, saves, runs scored, batting average, ERA, WHIP, wickets, tries, and medals.

According to a particular embodiment, there is a non-transitory computer readable storage medium having instructions stored thereupon that, when executed by a system having at least a processor and a memory therein, the instructions cause the system to perform operations including: receiving a request at the system from a remotely located user device requesting access to a user game interface; transmitting the user game interface to the user device for display; receiving first user input from the user game interface displayed to the user device, in which the first user input specifies one or more of: (i) game settings, (ii) rules of gameplay, and (iii) scoring settings; receiving second user input from the user game interface displayed to the user device, in which the second user input specifies multiple players to participate as a player league in a game instance; creating the player league and instantiating the game instance and the player league for the game instance at the system based on the first and second user inputs; setting a date and time for a league draft for the game instance; executing the league draft at the system by following a draft order for the multiple players of the player league, with each of the multiple players of the player league individually taking turns selecting an unclaimed polygon from a geographic map board during a first round of gameplay to establish a home territory for each of the multiple players of the player league; accumulating points based on the rules of gameplay and scoring settings specified; and determining one of the multiple players within the player league as a winner based on which player has accumulated a highest point total after all rounds of gameplay and terminating the game instance.

Figure 6:
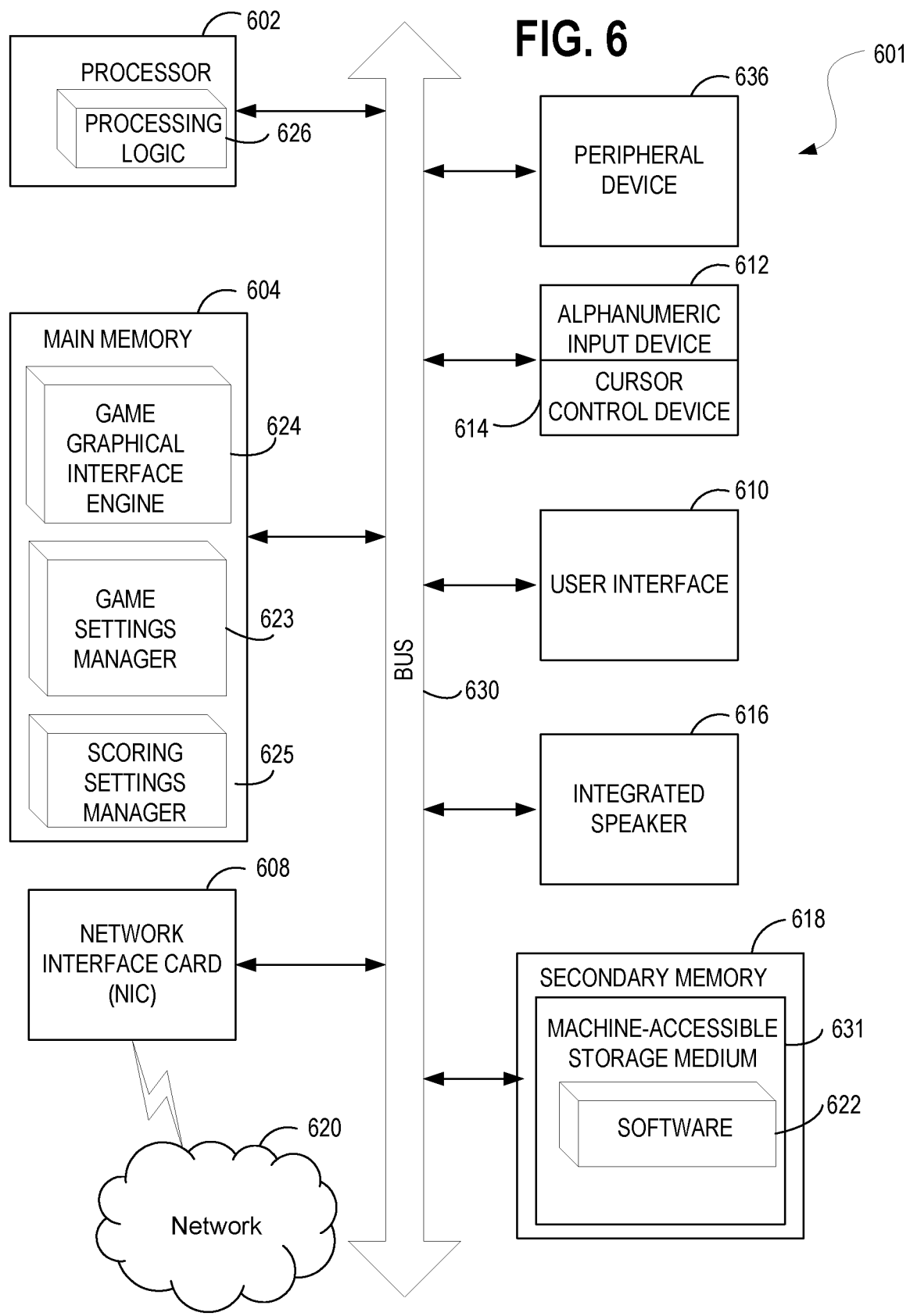
FIG. 6 illustrates a diagrammatic representation of a machine in the exemplary form of a computer system, in accordance with one embodiment.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes a game graphical interface engine 624 and a game settings manager 623 and a scoring settings manager 625 which operate to implement the online map-based sports fantasy game competition as described herein. Main memory 604 and its sub-elements are further operable in conjunction with processing logic 626 and processor 602 to perform the methodologies discussed herein.

Processor 602 represents one or more specialized and specifically configured processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display, etc.), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable storage medium or a non-transitory computer readable storage medium or a non-transitory machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

According to a particular embodiment, there is a specially configured system or machine which includes at least a memory to store instructions; a processor to execute the instructions at the system; in which the instructions are configured such that, when executed by the processor of the system, the system carries out operations including: receiving a request at the system from a remotely located user device requesting access to a user game interface; transmitting the user game interface to the user device for display; receiving first user input from the user game interface displayed to the user device, in which the first user input specifies one or more of: (i) game settings, (ii) rules of gameplay, and (iii) scoring settings; receiving second user input from the user game interface displayed to the user device, in which the second user input specifies multiple players to participate as a player league in a game instance; creating the player league and instantiating the game instance and the player league for the game instance at the system based on the first and second user inputs; setting a date and time for a league draft for the game instance; executing the league draft at the system by following a draft order for the multiple players of the player league, with each of the multiple players of the player league individually taking turns selecting an unclaimed polygon from a geographic map board during a first round of gameplay to establish a home territory for each of the multiple players of the player league; accumulating points based on the rules of gameplay and scoring settings specified; and determining one of the multiple players within the player league as a winner based on which player has accumulated a highest point total after all rounds of gameplay and terminating the game instance.

According to another embodiment, executing the league draft at the system by following the draft order further includes: each of the player leagues individually taking turns following the draft order selecting additional unclaimed polygons from the geographic map board expanding each respective player's league territory via subsequent rounds of gameplay.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art.

Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and memory therein, wherein the method comprises:
   executing instructions via the processor to expose a receive interface at the system;
   receiving a request at the system via the receive interfaced exposed from the system, wherein the request is received from a user device located remote from the system and requesting access to a user game interface;
   transmitting the user game interface from the system to the user device for display;
   receiving first user input from the user game interface displayed to the user device, wherein the first user input specifies one or more of: (i) game settings, (ii) rules of gameplay, and (iii) scoring settings;
   receiving second user input from the user game interface displayed to the user device, wherein the second user input specifies multiple players to participate as a player league in a game instance;
   creating the player league and instantiating the game instance and the player league for the game instance at the system based on the first and second user inputs;
   setting a date and time for a league draft for the game instance;
   executing the league draft at the system by following a draft order for the multiple players of the player league, with each of the multiple players of the player league individually taking turns selecting an unclaimed team or sports athlete from a polygon of the geographic map board during a first round of gameplay for each of the multiple players of the player league;
   iterating subsequent rounds of the league draft at the system, following a draft order for the multiple players of the player league, wherein the system enforces adjacency requirements limiting selection of one or more additional polygons by each player according to adjacency rules for the game instance as specified by the rules of game play;
   accumulating points based on the rules of gameplay and scoring settings specified and the results of the sports competitions; and
   determining one of the multiple players within the player league as a winner based on which player has accumulated a highest point total after all rounds of a season or tournament and terminating the game instance.

2. The method of claim 1, further comprising:
   iteratively repeating execution of the league draft through a plurality of draft rounds;
   wherein each draft round, each of the multiple players of the player league selects:
   (i) one additional polygon from the geographic map board that is adjacent to any polygon previously selected by the respective player in accordance with a first adjacency requirement established by the rules of gameplay; or alternatively (ii) one additional polygon from the geographic map board that is adjacent to the most recently selected polygon by the respective player in accordance with a second and different adjacency requirement established by the rules of gameplay.

3. The method of claim 1, wherein executing the league draft at the system by following the draft order further comprises:
a first player selecting a first exclusive sports athlete or team affiliated with an un-selected polygon, wherein the un-selected polygon becomes an exclusive territory of the first player;
a second player selecting a second exclusive sports athlete or team from a second un-selected polygon, wherein the second un-selected polygon becomes an exclusive territory of the second player.

4. The method of claim 1, wherein executing the league draft at the system by following the draft order further comprises:
a first player selecting a first exclusive sports athlete from a team affiliated with an un-selected polygon, wherein the un-selected polygon becomes a non-exclusive territory of the first player;
a second player selecting either:
(i) a second exclusive sports athlete from the team affiliated with the non-exclusive territory of the first player, wherein the non-exclusive territory of the first player becomes a non-exclusive territory of both the first player and the second player and further wherein the first exclusive sports athlete selected by the first player becomes un-selectable by any other player; or
(ii) a second exclusive sports athlete from a second team affiliated with a second un-selected polygon, wherein the second un-selected polygon becomes a non-exclusive territory of the second player.

5. The method of claim 1, wherein the method further comprises:
receiving a selection input at the system from one of the players indicating a selected polygon for the player during a round of the league draft;
responsively transmitting, from the system, to the user device for the respective player, a list of sports athletes affiliated with the sports team corresponding to the respective player's selected polygon;
receive a second selection input at the system from one of the respective players indicating a selected sports athlete from the list of sports athletes transmitted to the user device for the respective player;
affiliating the selected sports athlete with a customized team of the respective player in fulfillment of the players league draft round;
continuing execution of the league draft at the system, wherein each of the multiple players selects one of the sports athletes affiliated with the sports team corresponding to each respective player's polygon selections.

6. The method of claim 1, wherein the method further comprises one or more of:
adding a player-specified logo to each exclusive territory selected by a player and displaying the player-specified logo at the gaming interface to all player participants for the game instance;
adding a player-specified flag to each exclusive territory selected by a player and displaying the player-specified flag at the gaming interface to all player participants for the game instance;
adding a player-specified branding image to each exclusive territory selected by a player and displaying the player-specified branding image at the gaming interface to all player participants for the game instance; and
adding a player-specified image to each exclusive sports athlete selected by a player and displaying the player-specified image at the gaming interface to all player participants for the game instance.

7. The method of claim 1, further comprising:
automatically instantiating new gaming instances for a previously defined player league to conduct games on a daily, weekly, monthly, or seasonal basis, pursuant to game configuration settings and preferences established by a player participant assigned the role of the player league's commissioner.

8. The method of claim 1, wherein the system implements an online gaming platform;
wherein the online gaming platform executes via the processor and the memory of the system providing on-demand cloud based services to a plurality of player participant subscribers; and
wherein each of the player participant subscribers communicate with the online gaming platform system via a computing device which is remote from the online gaming platform and communicably interfaced with the online gaming platform via a public Internet.

9. The method of claim 1, further comprising:
receiving new user input requesting the system to instantiate a new game instance using the player league as defined previously;
receiving updates to one or more of the previously defined (i) game settings, (ii) rules of gameplay, (iii) scoring settings, or (iv) the player participants of the player league; and
instantiating the new game instance at the system for the player league utilizing the received updates for the new game instance.

10. The method of claim 1, further comprising:
transmitting the user game interface to the user device for display and further transmitting the user game interface to a plurality of additional user devices for display, the plurality of additional user devices corresponding to the players of the player league created for the game instance pursuant to the second user input specifying the players of the player league; and
wherein executing the league draft at the system by following the draft order for the players of the player league comprises prompting each of the user devices for user selection input according to player turns as defined by the draft order and enforced by the game instance created at the system.

11. The method of claim 1:
wherein each of the unclaimed polygons from the geographic map board represent competition teams, season teams, competing contestants of a sports tournament, or sports athletes affiliated with sports teams, virtualized within the game instance by the system.

12. The method of claim 1, wherein creating the player league includes:
assigning a first player participant the role of a commissioner;
receiving at the system, contact information from the commissioner via the user game interface specifying one or more player participants to join the player league;

transmitting, from the system, invitations to join the game instance to the specified one or more player participants; and receiving acceptance of the invitations to join the game instance from the specified one or more player participants and responsively creating profiles for each of the one or more player participants having joined.

13. The method of claim 1, wherein creating the player league includes:

creating, at the system, a random player league and accepting random player participants into the random player league during a period of open enrollment or until a threshold number of random player participants join the random player league; or alternatively joining one or more additional player participants randomly into a player-organized player league during a period of open enrollment or until a threshold number of random player participants join the player-organized player league.

14. The method of claim 1, further comprising:

transmitting to the user device alternative views of the game instance for display at the user device responsive to receiving a click event on one of the geographic map board polygons at the user game interface during execution of the league draft or subsequent to the start of the season or tournament;

wherein the alternative view includes one or more of tables, graphs, statistics, player participant information, game points, and real-time sports results for the game instance.

15. The method of claim 1, wherein the geographic map board embodies one of:

a geographic region divided into polygons based on shortest Euclidean distance to a team location (Thiessen polygons), each configured around a point signifying a team location;

a geographic region divided into polygons based on shortest driving distance to a team location, each configured around a point signifying a team location;

a plurality of polygons defining pre-established geographic regions corresponding to any of states, provinces, districts, and countries;

graphically represented changes in gameplay via altering of color or shading of the plurality of polygons of the geographic map board as the polygons are claimed by player leagues; and graphically represented changes in gameplay via updated statistics representing a current state of the game instance.

16. The method of claim 1, wherein the game settings specify one or more of:

a boxed-in condition for any player resulting in the boxed-in player being restricted from selecting any additional polygons throughout any subsequent round of the league draft regardless of having one or more unused league draft turns available when no unclaimed polygons adjacent to the boxed-in player's claimed territories are available for selection;

a boxed-in condition for any player resulting in the boxed-in player permissibly selecting a non-adjacent and unclaimed polygon; and a boxed-in condition for any player resulting in the boxed-in player losing at least one turn for selecting unclaimed polygons and subsequently permissibly selecting a non-adjacent and unclaimed polygon during a subsequent round of gameplay.

17. The method of claim 1:

wherein the game scoring settings specify one or more team draft settings from the group comprising: points awarded for lower seeds, points awarded for defeating higher seeds, points awarded for reaching a specified round of gameplay, points awarded for playoff victories, points awarded for earning a home territory playoff advantage, and points awarded pursuant to a winner-take-all competition format; and wherein the game scoring settings specify one or more individual sports athlete draft settings from the group comprising: points awarded for sports athlete points scored, yards gained, touchdowns, catches, extra points, 2-point conversions, field goals, three pointers, rebounds, assists, steals, blocks, interceptions, fumbles, sacks, Runs Batted In (RBI), home runs, wins, saves, runs scored, batting average, Earned Run Average (ERA), Walks plus Hits per Innings Pitched (WHIP), wickets, tries, and medals.

18. Non-transitory computer readable storage media having instructions stored thereupon that, when executed by a system having at least a processor and a memory therein, the instructions cause the system to perform operations including:

executing instructions via the processor to expose a receive interface at the system;

receiving a request at the system via the receive interfaced exposed from the system, wherein the request is received from a user device located remote from the system and requesting access to a user game interface;

transmitting the user game interface from the system to the user device for display;

receiving first user input from the user game interface displayed to the user device, wherein the first user input specifies one or more of: (i) game settings, (ii) rules of gameplay, and (iii) scoring settings;

receiving second user input from the user game interface displayed to the user device, wherein the second user input specifies multiple players to participate as a player league in a game instance;

creating the player league and instantiating the game instance and the player league for the game instance at the system based on the first and second user inputs;

setting a date and time for a league draft for the game instance;

executing the league draft at the system by following a draft order for the multiple players of the player league, with each of the multiple players of the player league individually taking turns selecting an unclaimed polygon from a geographic map board during a first round of gameplay to establish a home territory for each of the multiple players of the player league;

accumulating points based on the rules of gameplay and scoring settings specified; and determining one of the multiple players within the player league as a winner based on which player has accumulated a highest point total after all rounds of gameplay and terminating the game instance.

19. The non-transitory computer readable storage media of claim 18, wherein execution of the instructions by the processor causes the system to perform additional operations comprising:

iteratively repeating execution of the league draft through a plurality of draft rounds;

wherein each draft round, each of the multiple players of the player league selects:

(i) one additional polygon from the geographic map board that is adjacent to any polygon previously selected by the respective player in accordance with a first adjacency requirement established by the rules of gameplay; or alternatively (ii) one additional polygon from the geographic map board that is adjacent to the most recently selected polygon by the respective player in accordance with a second and different adjacency requirement established by the rules of gameplay.

20. A system comprising:

a memory to store instructions;

a processor to execute the instructions at the system;

wherein the instructions are configured such that, when executed by the processor of the system, the system carries out operations including:

executing instructions via the processor to expose a receive interface at the system;

receiving a request at the system via the receive interfaced exposed from the system, wherein the request is received from a user device located remote from the system and requesting access to a user game interface;

transmitting the user game interface from the system to the user device for display;

receiving first user input from the user game interface displayed to the user device, wherein the first user input specifies one or more of: (i) game settings, (ii) rules of gameplay, and (iii) scoring settings;

receiving second user input from the user game interface displayed to the user device, wherein the second user input specifies multiple players to participate as a player league in a game instance;

creating the player league and instantiating the game instance and the player league for the game instance at the system based on the first and second user inputs;

setting a date and time for a league draft for the game instance;

executing the league draft at the system by following a draft order for the multiple players of the player league, with each of the multiple players of the player league individually taking turns selecting an unclaimed polygon from a geographic map board during a first round of gameplay to establish a home territory for each of the multiple players of the player league;

accumulating points based on the rules of gameplay and scoring settings specified; and determining one of the multiple players within the player league as a winner based on which player has accumulated a highest point total after all rounds of gameplay and terminating the game instance.

* * * * *